US012671539B2

(12) United States Patent
Shah et al.

(10) Patent No.: US 12,671,539 B2
(45) Date of Patent: Jun. 30, 2026

(54) REFERENCE SIGNAL DESIGNS FOR MULTIPLE ACCESS IN UPLINK

(71) Applicant: QUALCOMM Incorporated, San Diego, CA (US)

(72) Inventors: Syed Hashim Ali Shah, San Diego, CA (US); Ayan Sengupta, San Diego, CA (US); Alberto Rico Alvarino, San Diego, CA (US); Xiao Feng Wang, San Diego, CA (US); Liangping Ma, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 302 days.

(21) Appl. No.: 18/471,140

(22) Filed: Oct. 4, 2023

(65) Prior Publication Data

US 2025/0119250 A1    Apr. 10, 2025

(51) Int. Cl.
*H04L 27/26* (2006.01)
*H04L 5/00* (2006.01)
*H04W 72/20* (2023.01)

(52) U.S. Cl.
CPC ...... *H04L 5/0048* (2013.01); *H04L 27/26035* (2021.01); *H04W 72/20* (2023.01)

(58) Field of Classification Search
USPC .... 370/229, 230, 230.1, 236, 241, 252, 312, 370/328, 329, 330, 332
See application file for complete search history.

(56) References Cited

U.S. PATENT DOCUMENTS

| | | | |
|---|---|---|---|
| 10,057,030 B2 | 8/2018 | Jöngren et al. | |
| 2008/0049668 A1* | 2/2008 | Kakura | H04L 1/20 370/329 |
| 2020/0220681 A1* | 7/2020 | Yang | H04L 5/001 |
| 2021/0185706 A1* | 6/2021 | Park | H04W 72/23 |

(Continued)

FOREIGN PATENT DOCUMENTS

| | | |
|---|---|---|
| EP | 4009688 A1 | 6/2022 |
| WO | WO-2023170658 A1 | 9/2023 |

OTHER PUBLICATIONS

International Search Report and Written Opinion—PCT/US2024/046542—ISA/EPO—Jan. 2, 2025 (2304559WO ).

(Continued)

*Primary Examiner* — Nguyen H Ngo
(74) *Attorney, Agent, or Firm* — Holland & Hart LLP

(57) ABSTRACT
Methods, systems, and devices for wireless communications are described. A reference signal distribution scheme described herein may allow for the benefits of orthogonal cover codes, and improve mechanisms to identify and address resulting carrier frequency offset. Techniques are described for distributing reference signals (e.g., demodulation reference signals) over a set of resources. The reference signals may be arranged in equi-spaced clusters, where groups of the reference signals per cluster are spaced according to a first timing offset, and where each cluster may be spaced according to a second timing offset. The network may configure the reference signal distribution scheme at various user equipments, indicating values for the timing offset. The user equipments may transmit reference signals according to the indicated scheme.

23 Claims, 20 Drawing Sheets

Transmit control signaling including an indication of a scheme for distributing reference signals over resources that are multiplexed to communicate signals for multiple user equipments (UEs) using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof
⟍ 1905

Receive one or more reference signals from the multiple UEs according to the scheme
⟍ 1910

⟍ 1900

(56) References Cited

U.S. PATENT DOCUMENTS

2022/0123908 A1* 4/2022 Huang ................. H04L 5/0051

OTHER PUBLICATIONS

ZTE, et al ., "Remaining Details on DL DMRS and UL DMRS", 3GPP TSG RAN WG1 Meeting 90bis, R1-1717433, 3rd Generation Partnership Project, Mobile Competence Centre, 650, Route Des Lucioles, F-06921 Sophia-Antipolis Cedex, France, vol. RAN WG1, No. Prague, CZ, Oct. 9, 2017-Oct. 13, 2017, pp. 1-8, Oct. 8, 2017, XP051340622, Section 2.

* cited by examiner

1310

1320

1315

1305

1300

130

105

115

Network Entity

Transceiver

1610

Antenna

1615

Communications Manager

1620

Memory

Code

1630

1625

Processor

1635

1640

1605

1600

Figure 17:
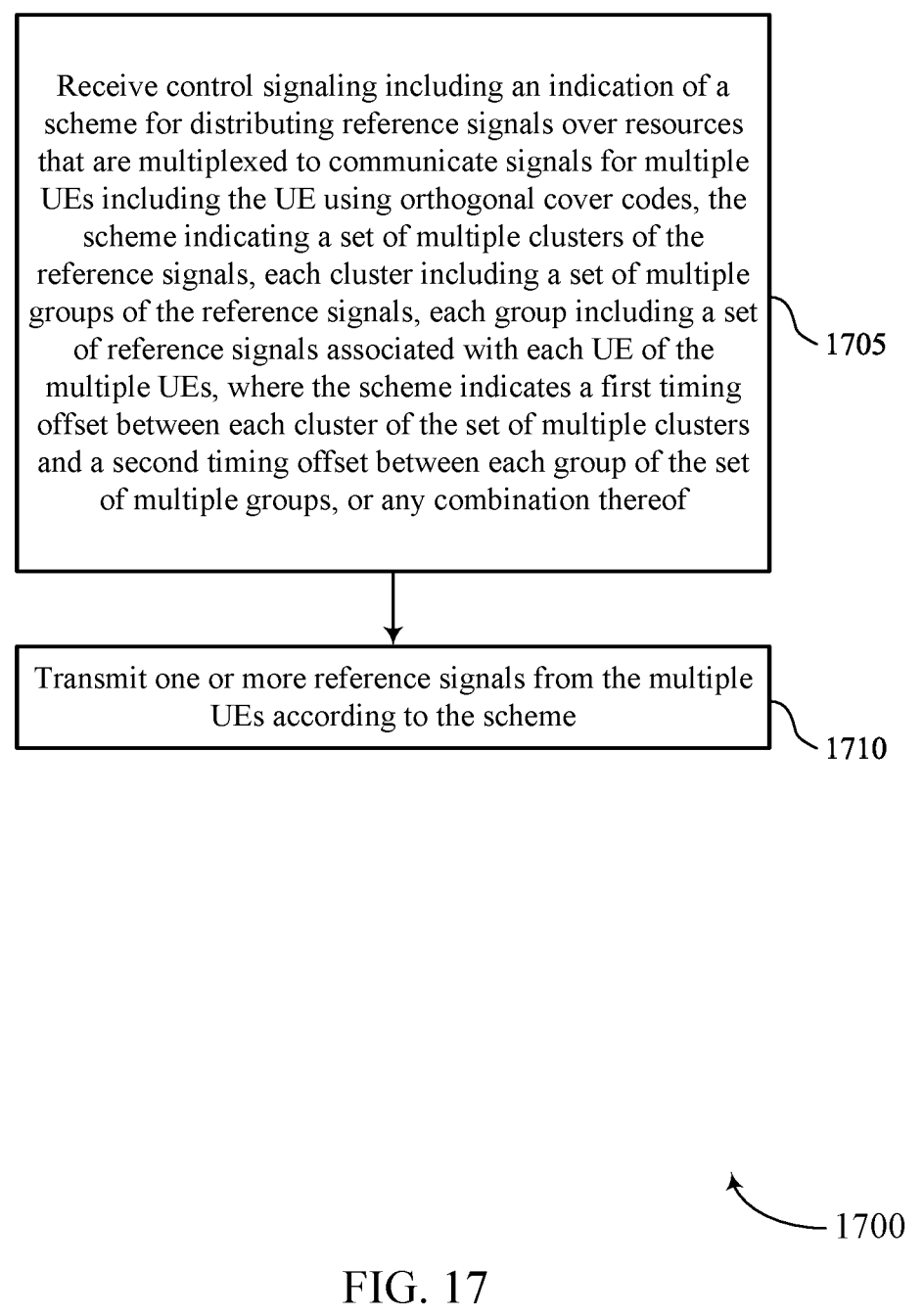

Receive control signaling including an indication of a scheme for distributing reference signals over resources that are multiplexed to communicate signals for multiple UEs including the UE using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof

1705

Transmit one or more reference signals from the multiple UEs according to the scheme

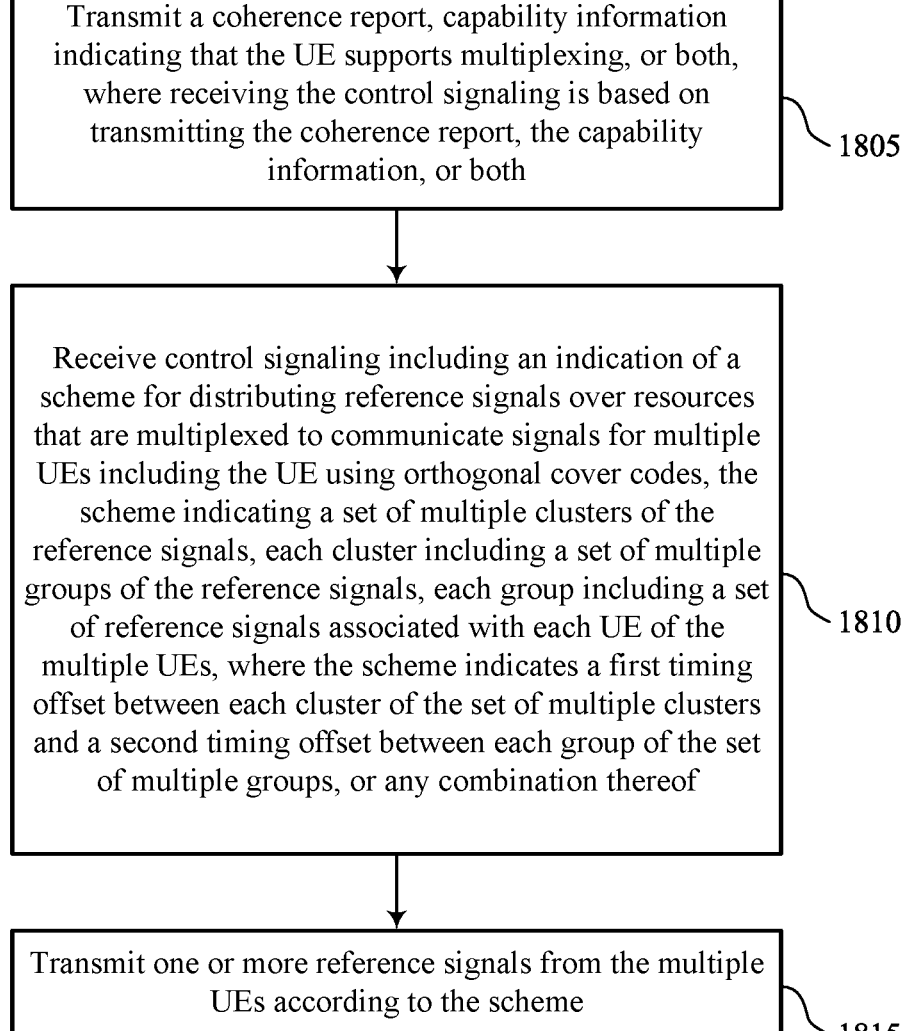

Transmit a coherence report, capability information indicating that the UE supports multiplexing, or both, where receiving the control signaling is based on transmitting the coherence report, the capability information, or both

1805

Receive control signaling including an indication of a scheme for distributing reference signals over resources that are multiplexed to communicate signals for multiple UEs including the UE using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof

1810

Transmit one or more reference signals from the multiple UEs according to the scheme

Figure 19:
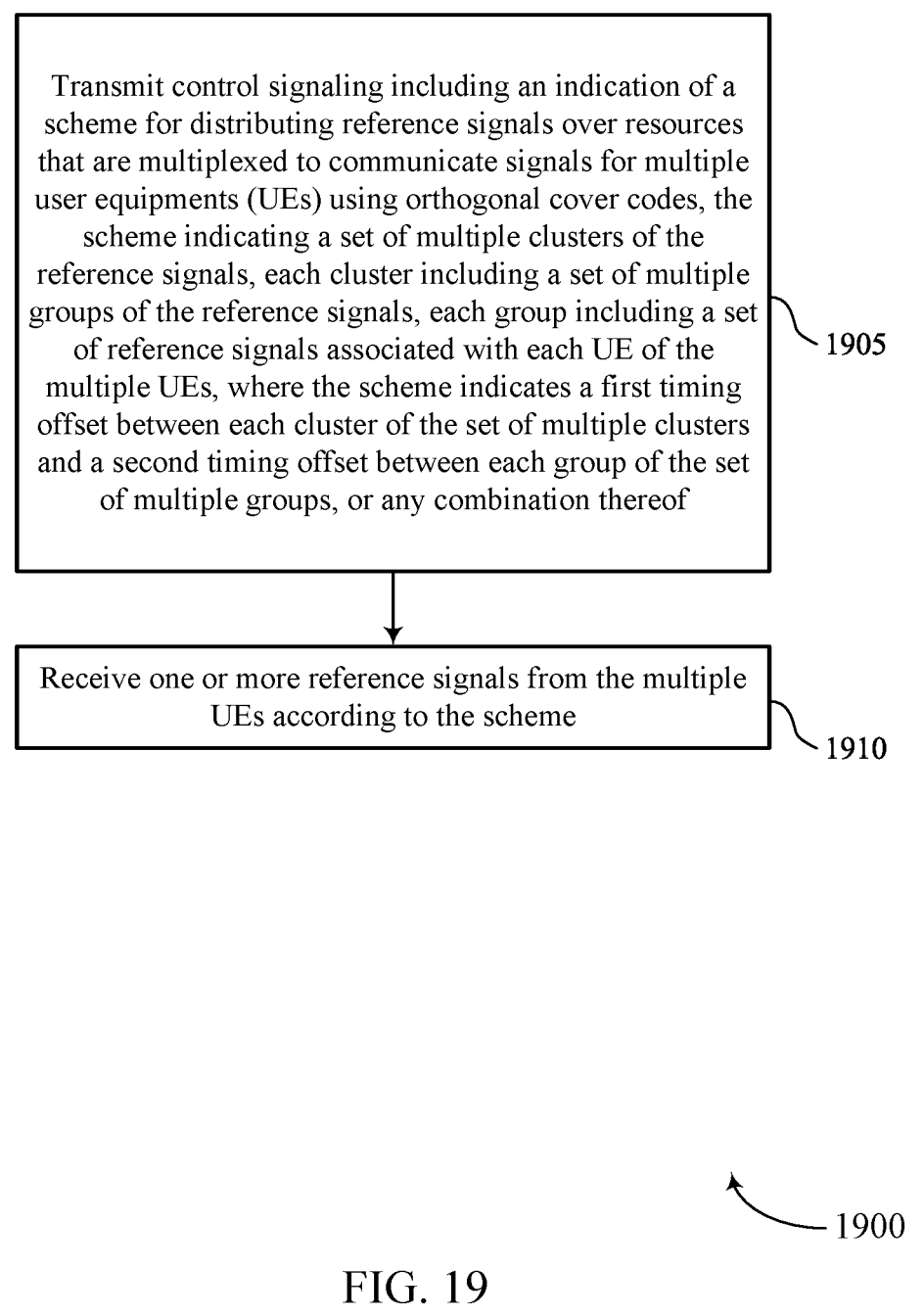

Transmit control signaling including an indication of a scheme for distributing reference signals over resources that are multiplexed to communicate signals for multiple user equipments (UEs) using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof

1905

Receive one or more reference signals from the multiple UEs according to the scheme

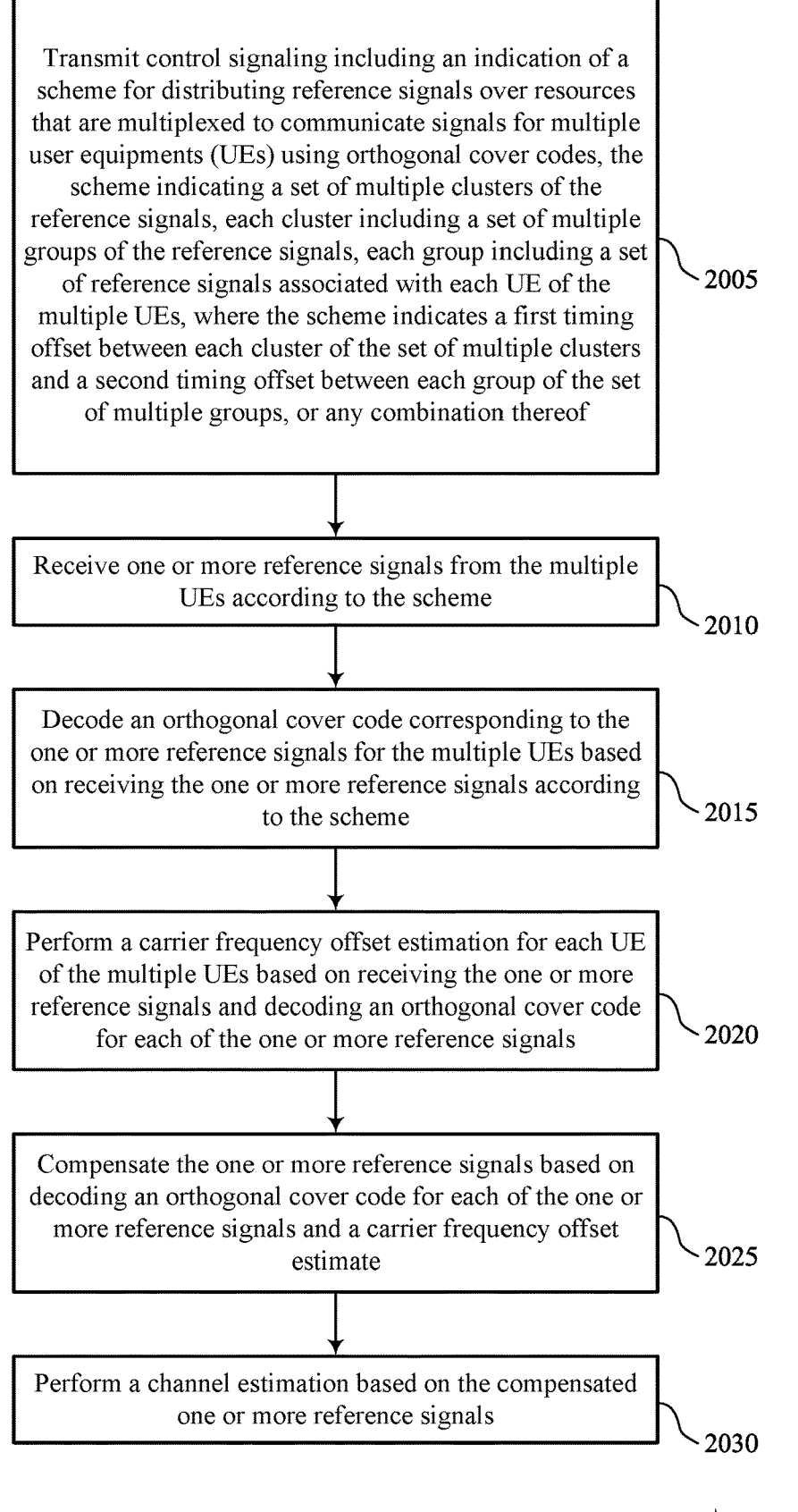

Transmit control signaling including an indication of a scheme for distributing reference signals over resources that are multiplexed to communicate signals for multiple user equipments (UEs) using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof
└ 2005

Receive one or more reference signals from the multiple UEs according to the scheme
└ 2010

Decode an orthogonal cover code corresponding to the one or more reference signals for the multiple UEs based on receiving the one or more reference signals according to the scheme
└ 2015

Perform a carrier frequency offset estimation for each UE of the multiple UEs based on receiving the one or more reference signals and decoding an orthogonal cover code for each of the one or more reference signals
└ 2020

Compensate the one or more reference signals based on decoding an orthogonal cover code for each of the one or more reference signals and a carrier frequency offset estimate
└ 2025

Perform a channel estimation based on the compensated one or more reference signals
└ 2030

REFERENCE SIGNAL DESIGNS FOR MULTIPLE ACCESS IN UPLINK

FIELD OF TECHNOLOGY

The following relates to wireless communications, including reference signal designs for multiple access in uplink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support reference signal designs for multiple access in uplink. For example, the described techniques describe a reference signal (e.g., demodulation reference signal (DMRS)) distribution scheme described herein may allow for the benefits of orthogonal cover code (OCC) transmissions, while still providing a mechanism to identify and address resulting carrier frequency offset (CFO). Techniques are described for distributing reference signals (e.g., DMRSs) over a set of resources. The DMRSs may be arranged in equi-spaced clusters of length 2M (two OCC groups of DMRSs per cluster, each group spaced by a quantity of symbols K), and each cluster may be spaced every L symbols (where L=7 symbols times 2M). The network may configure the DMRS distribution scheme, indicating values for K and L (e.g., among other examples of parameter values). User equipments (UEs) may transmit DMRSs according to the indicated scheme. The network entity may perform a de-OCC operation (e.g., may decode the OCC) for the DMRSs based on the multiplexed DMRSs from multiple UEs (e.g., for each UE), and obtain a CFO estimate from the de-OCC'd DMRSs for each UE. The CFO estimate may be based on a raw estimate (e.g., comparing the phase shift of each group within a cluster), a refined estimate (e.g., comparing phase shift of each group across clusters, such as a first group of a first cluster with a first group of a second cluster, a second group of the first cluster with a second group of the second cluster, etc.), and a further refined estimate using a local maximum likelihood search. The network may then compensate the de-OCC'd DMRS using the CFO estimate, perform channel estimation, de-OCC the data received via symbols interspersed between groups and/or clusters, compensate for the CFO in the de-OCC'd data, and demodulate the data based thereon.

A method for wireless communications by a UE is described. The method may include receiving control signaling including an indication of a scheme for distributing reference signals over resources that are multiplexed to communicate signals for multiple UEs including the UE using OCCs, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof and transmitting one or more reference signals from the multiple UEs according to the scheme.

A UE for wireless communications is described. The UE may include one or more memories storing processor executable code, and one or more processors coupled with the one or more memories. The one or more processors may individually or collectively operable to execute the code to cause the UE to receive control signaling including an indication of a scheme for distributing reference signals over resources that are multiplexed to communicate signals for multiple UEs including the UE using OCCs, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof and transmit one or more reference signals from the multiple UEs according to the scheme.

Another UE for wireless communications is described. The UE may include means for receiving control signaling including an indication of a scheme for distributing reference signals over resources that are multiplexed to communicate signals for multiple UEs including the UE using OCCs, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof and means for transmitting one or more reference signals from the multiple UEs according to the scheme.

A non-transitory computer-readable medium storing code for wireless communications is described. The code may include instructions executable by a processor to receive control signaling including an indication of a scheme for distributing reference signals over resources that are multiplexed to communicate signals for multiple UEs including the UE using OCCs, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof and transmit one or more reference signals from the multiple UEs according to the scheme.

US 12,671,539 B2

3

Some examples of the method, UEs, and non-transitory computer-readable medium described herein may further include operations, features, means, or instructions for receiving, via the control signaling, an indication of a quantity of the multiple UEs, an OCC codeword corresponding to the OCCs, or both.

Some examples of the method, UEs, and non-transitory computer-readable medium described herein may further include operations, features, means, or instructions for receiving, via the control signaling, an indication of a third timing offset between reference signals in each group of the set of multiple groups.

Some examples of the method, UEs, and non-transitory computer-readable medium described herein may further include operations, features, means, or instructions for transmitting a coherence report, capability information indicating that the UE supports multiplexing, or both, where receiving the control signaling may be based on transmitting the coherence report, the capability information, or both.

In some examples of the method, UEs, and non-transitory computer-readable medium described herein, receiving the control signaling may include operations, features, means, or instructions for receiving a first control message including an indication of a set of multiple schemes for distributing reference signals over the resources that may be multiplexed to communicate the signals for the multiple UEs using the OCCs, the set of multiple schemes including the scheme and receiving a second control message indicating the scheme from the set of multiple schemes.

In some examples of the method, UEs, and non-transitory computer-readable medium described herein, each reference signal of a group of reference signals of the set of multiple groups of the reference signals may be orthogonal with respect to the multiple UEs.

A method for wireless communications by a network entity is described. The method may include transmitting control signaling including an indication of a scheme for distributing reference signals over resources that are multiplexed to communicate signals for multiple UEs using OCCs, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof and receiving one or more reference signals from the multiple UEs according to the scheme.

A network entity for wireless communications is described. The network entity may include one or more memories storing processor executable code, and one or more processors coupled with the one or more memories. The one or more processors may individually or collectively operable to execute the code to cause the network entity to transmit control signaling including an indication of a scheme for distributing reference signals over resources that are multiplexed to communicate signals for multiple UEs using OCCs, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof and receive one or more reference signals from the multiple UEs according to the scheme.

Another network entity for wireless communications is described. The network entity may include means for transmitting control signaling including an indication of a scheme for distributing reference signals over resources that are multiplexed to communicate signals for multiple UEs using OCCs, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof and means for receiving one or more reference signals from the multiple UEs according to the scheme.

A non-transitory computer-readable medium storing code for wireless communications is described. The code may include instructions executable by a processor to transmit control signaling including an indication of a scheme for distributing reference signals over resources that are multiplexed to communicate signals for multiple UEs using OCCs, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof and receive one or more reference signals from the multiple UEs according to the scheme.

Some examples of the method, network entities, and non-transitory computer-readable medium described herein may further include operations, features, means, or instructions for decoding an OCC corresponding to the one or more reference signals for the multiple UEs based on receiving the one or more reference signals according to the scheme.

Some examples of the method, network entities, and non-transitory computer-readable medium described herein may further include operations, features, means, or instructions for performing a CFO estimation for each UE of the multiple UEs based on receiving the one or more reference signals and decoding an OCC for each of the one or more reference signals.

In some examples of the method, network entities, and non-transitory computer-readable medium described herein, performing the CFO estimation may include operations, features, means, or instructions for generating a first CFO estimate based on measuring a phase rotation between at least a first group and a second group of the set of multiple groups within at least a first cluster of the set of multiple clusters, generating, according to a compensation of the first CFO estimate, a second CFO estimate based on measuring a phase rotation between at least the first group of the first cluster and a corresponding first group of a second cluster of the set of multiple clusters and across at least the second group of the first cluster and a corresponding second group of the second cluster, and generating, according to a compensation of the second CFO estimate, a third CFO estimate by applying a likelihood estimator to a CFO value corresponding to the one or more reference signals compensated by the first CFO estimate and the second CFO estimate, where a total CFO may be based on the first CFO estimate, the second CFO estimate, and the third CFO estimate.

Some examples of the method, network entities, and non-transitory computer-readable medium described herein may further include operations, features, means, or instructions for compensating the one or more reference signals based on decoding an OCC for each of the one or more reference signals and a CFO estimate.

Some examples of the method, network entities, and non-transitory computer-readable medium described herein may further include operations, features, means, or instructions for performing a channel estimation based on the compensated one or more reference signals.

Some examples of the method, network entities, and non-transitory computer-readable medium described herein may further include operations, features, means, or instructions for receiving data signaling from the multiple UEs via one or more symbols located between the set of multiple groups of each cluster and decoding the OCC corresponding to the data signaling based on the compensated one or more reference signals and the decoded OCC for each of the one or more reference signals.

Some examples of the method, network entities, and non-transitory computer-readable medium described herein may further include operations, features, means, or instructions for compensating the data signaling according to the CFO estimate and based on decoding the OCC corresponding to the data signaling, demodulating the compensated data signaling, and sending the demodulated data to a channel decoder.

Some examples of the method, network entities, and non-transitory computer-readable medium described herein may further include operations, features, means, or instructions for transmitting, via the control signaling, an indication of a quantity of the multiple UEs, an OCC codeword corresponding to the OCCs, or both.

Some examples of the method, network entities, and non-transitory computer-readable medium described herein may further include operations, features, means, or instructions for transmitting, via the control signaling, an indication of a third timing offset between reference signals in each group of the set of multiple groups.

Some examples of the method, network entities, and non-transitory computer-readable medium described herein may further include operations, features, means, or instructions for receiving, from one or more of the multiple UEs, a coherence report, capability information indicating that the multiple UEs support multiplexing, or both, where transmitting the control signaling may be based on receiving the coherence report, the capability information, or both.

In some examples of the method, network entities, and non-transitory computer-readable medium described herein, transmitting the control signaling may include operations, features, means, or instructions for transmitting a first control message including an indication of a set of multiple schemes for distributing reference signals over the resources that may be multiplexed to communicate the signals for the multiple UEs using the OCCs, the set of multiple schemes including the scheme and transmitting a second control message indicating the scheme selected from the set of multiple schemes for use.

In some examples of the method, network entities, and non-transitory computer-readable medium described herein, de-orthogonal cover coding the set of reference signals of each group of the of the set of multiple groups of a first cluster of reference signals.

Some examples of the method, network entities, and non-transitory computer-readable medium described herein may further include operations, features, means, or instructions for performing, for each cluster, a dot product for each row of a matrix of an OCC corresponding to the one or more reference signals for the multiple UEs, each row of the matrix corresponding to a respective UE of the multiple UEs and generating, based on the dot product, a combined symbol for which the OCC may have been decoded for each group of each cluster by combining a quantity of symbols corresponding to a quantity of the multiple UEs for each group of each cluster.

BRIEF DESCRIPTION OF THE DRAWINGS

FIGS. 17 through 20 show flowcharts illustrating methods that support reference signal designs for multiple access in uplink in accordance with one or more aspects of the present disclosure.

DETAILED DESCRIPTION

Figure 1:
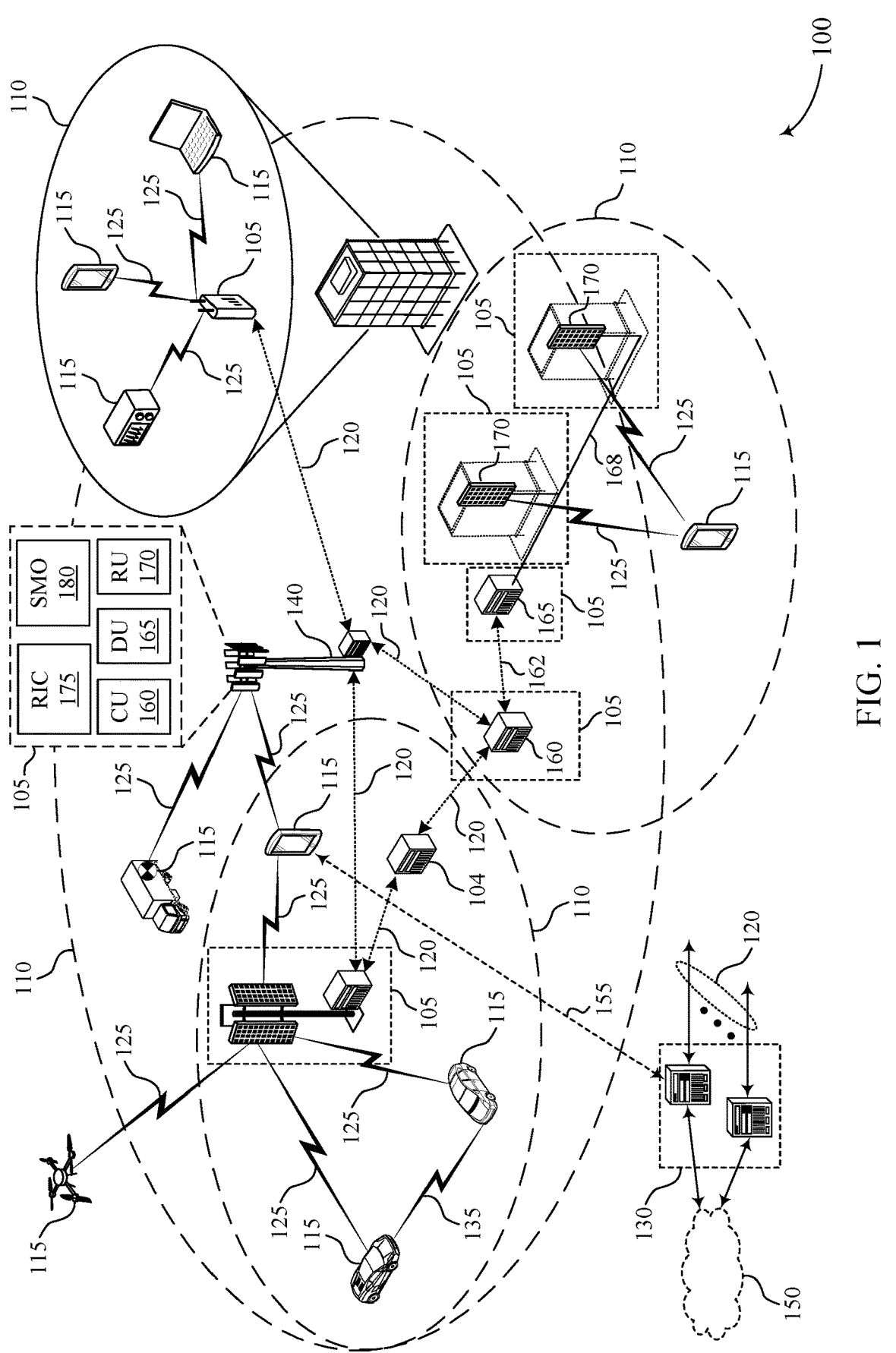
FIG. 1 shows an example of a wireless communications system that supports reference signal designs for multiple access in uplink in accordance with one or more aspects of the present disclosure.

In some wireless communication systems, multiple user equipments (UEs) may transmit multiplexed uplink signaling in time (e.g., via a multiple access scheme), resulting in multiple uplink transmissions via the same time-frequency resources. To mitigate interference at the network entity, an orthogonal cover code (OCC) may be applied across multiple repetitions of such multiplexed uplink communications. Such OCC transmissions may decrease interference between multiplexed UEs at a limited overhead cost, but may also increase the duration of transmitted signals (e.g., by increasing a quantity of repetitions transmitted). Because of the increased duration, OCC transmissions may result in a greater carrier frequency offset (CFO) over the duration of the signal. An increased CFO may add a phase ramp to a time signal, and the longer a signal duration (e.g., proportional to a quantity of multiplexed UEs), the more phase distortion and degradation of performance may occur.

Reference signal measurement (e.g., demodulation reference signal (DMRS) measurements) may be used to estimate and nullify the impact of CFO. However, some wireless communications may implement a uniform DMRS allocation over time, which may result in too much phase offset between different instances of reference signals to use those reference signals to effectively correct for CFO. For example, an OCC may span a large quantity of symbols interspersed with DMRS symbols, such that a phase shift may go beyond 2× for the reference signals. Such conditions may make the signal unrecoverable due to CFO in less DMRS symbols than a total quantity of DMRS symbols interspersed across the repetitions of the OCC.

A DMRS distribution scheme described herein may allow for the benefits of OCC, while still providing a mechanism to identify and address resulting CFO. Techniques are described for distributing reference signals (e.g., DMRSs) over a set of resources. The DMRSs may be arranged in equi-spaced clusters of length 2M (two OCC groups of DMRSs per cluster, each group spaced by a quantity of symbols K), and each cluster may be spaced every L symbols (where L=7 symbols times 2M). The network may configure the DMRS distribution scheme, indicating values for K and L. The UE may transmit DMRSs according to the indicated scheme. The network may perform a de-OCC operation (e.g., decode the OCC) for the DMRSs based on the multiplexed DMRSs from multiple UEs (e.g., for each UE), and obtain a CFO estimate from the de-OCC'd DMRSs for each UE. The CFO estimate may be based on a raw estimate (e.g., comparing the phase shift of each group within a cluster), a refined estimate (e.g., comparing phase shift of each group across clusters, such as a first group of a first cluster with a first group of a second cluster, a second group of the first cluster with a second group of the second cluster, etc.), and a further refined estimate using a local maximum likelihood (ML) estimator (e.g., an ML search). The network may then compensate the de-OCC'd DMRS using the CFO estimate, perform channel estimation, de-OCC the data received via symbols interspersed between groups and/or clusters, compensate the CFO in the de-OCC'd data, and demodulate the data based thereon.

Aspects of the disclosure are initially described in the context of wireless communications systems. Aspects of the disclosure are further illustrated by and described with reference to wireless communications systems, resource configurations, timelines, flow diagrams, and process flows. Aspects of the disclosure are further illustrated by and described with reference to apparatus diagrams, system diagrams, and flowcharts that relate to reference signal designs for multiple access in uplink.

FIG. 1 shows an example of a wireless communications system 100 that supports reference signal designs for multiple access in uplink in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled)

by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support reference signal designs for multiple access in uplink as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum, and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A reference signal (e.g., DMRS) distribution scheme described herein may allow for the benefits of OCC transmissions, while still providing a mechanism to identify and address resulting CFO. Techniques are described for distributing reference signals (e.g., DMRSs, but techniques described herein may apply to any reference signal, such as PTRSs, among other examples) over a set of resources. The DMRSs may be arranged in equi-spaced clusters of length 2M (two OCC groups of DMRSs per cluster, each group spaced by a quantity of symbols K), and each cluster may be spaced every L symbols (where L=7 symbols times 2M). The network may configure the DMRS distribution scheme, indicating values for K and L. The UEs 115 may transmit DMRSs according to the indicated scheme. The network entity 105 may perform a de-OCC operation (e.g., decode the OCC) for the DMRSs based on the multiplexed DMRSs from multiple UEs 115 (e.g., for each UE 115), and obtain a CFO estimate from the de-OCC'd DMRSs for each UE 115. The CFO estimate may be based on a raw estimate (e.g., comparing the phase shift of each group within a cluster), a refined estimate (e.g., comparing phase shift of each group across clusters, such as a first group of a first cluster with a first group of a second cluster, a second group of the first cluster with a second group of the second cluster, etc.), and a further refined estimate using a local ML search. The network may then compensate the de-OCC'd DMRS using the CFO estimate, perform channel estimation, de-OCC the data received via symbols interspersed between groups and/or clusters, compensate the CFO in the de-OCC'd data, and demodulate the data based thereon.

Figure 2:
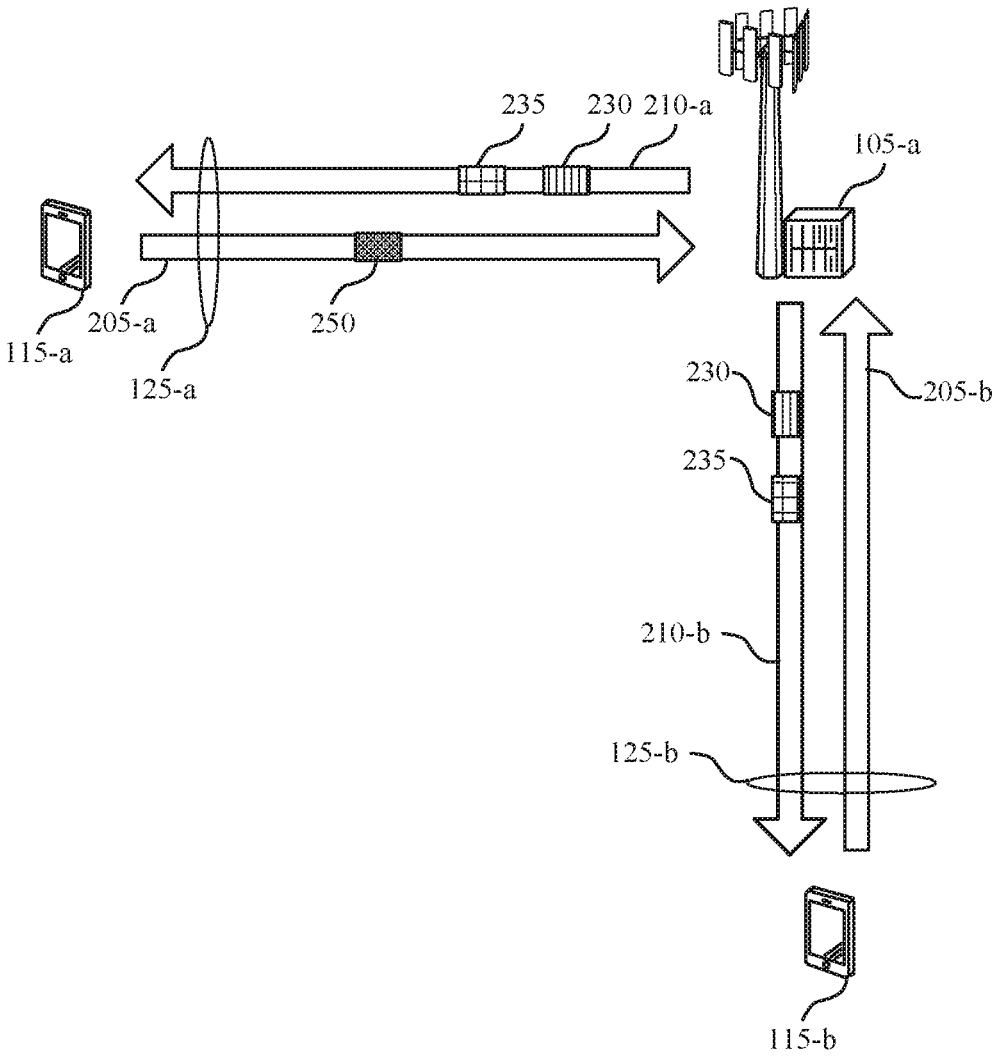
FIG. 2 shows an example of a wireless communications system that supports reference signal designs for multiple access in uplink in accordance with one or more aspects of the present disclosure.

FIG. 2 shows an example of a wireless communications system 200 that supports reference signal designs for multiple access in uplink in accordance with one or more aspects of the present disclosure. The wireless communications system 200 may implement aspects of or may be implemented by aspects of the wireless communications system 100. For example, the wireless communications system 200 includes a UE 115-a and a UE 115-b, which may be examples of a UE 115 described with respect to FIG. 1. The wireless communications system 200 also includes a first network entity 105-a, which may be an example of a network entity 105 as described with respect to FIG. 1. In some examples, the UE 115-a and/or the UE 115-b may be NB IoT devices.

To ensure reliable communications, the UE 115-a and/or the UE 115-b may transmit multiple coded copies of data (e.g., may transmit repetitions of data). In some examples, the repetitions may include HARQ RVs. The repetitions may be used as a method or dimension to multiplex multiple uplink transmission from the UE 115-a and the UE 115-b to facilitate increasing uplink capacity (e.g., packing transmissions from multiple UEs 115 into the same time-frequency resources). The multiple UEs 115 may transmit RVs in the same time and frequency resources. However, multiplexing multiple UEs 115 may create interference at the network entity 105-a. As discussed herein, an OCC [orthogonal cover coding] configuration may mitigate the potential interference. In particular, the data from the UEs 115 may be cover coded across RVs in an orthogonal manner. In some cases, the multiple UEs 115 (e.g., the UE 115-a and/or the UE 115-b) may also use orthogonal reference signals (e.g., DMRSs), which may use their own OCC. The techniques are described with reference to DMRSs. However, the techniques described herein may be adapted to be applied to any type of reference signal.

The UE 115-a may communicate with the network entity 105-a using a communication link 125-a, and the UE 115-b may communicate with the network entity 105-a using a communication link 125-b. The communication link 125-a may be an example of an NR or LTE link between the UE 115-a and the network entity 105-a. The communication link 125-b may be an example of an NR or LTE link between the UE 115-b and the network entity 105-b. In some examples, the communication link 125-a and/or the communication link 125-b may be examples of a non-terrestrial network link. A non-terrestrial network may be a communications network that facilitates communications between terrestrial-based nodes (e.g., UEs, terrestrial-based network entities, base stations) and non-terrestrial based nodes (e.g., satellites, airplanes, balloons). The communication link 125-a and the communication link 125-b may include bi-directional links that enable both uplink and downlink communications. For example, the UE 115-a may transmit the uplink signals 205-a (e.g., uplink transmissions), such as uplink control signals or uplink data signals, to the network entity 105-a using the communication link 125-a and the network entity 105-a may transmit downlink signals 210-a (e.g., downlink transmissions), such as downlink control signals or downlink data signals, to the UE 115-a using the communication link 125-a. The UE 115-b may transmit uplink signals 205-b (e.g., uplink transmissions), such as uplink control signals or uplink data signals, to the network entity 105-a using the communication link 125-b and the network entity 105-a may transmit downlink signals 210-b (e.g., downlink transmissions), such as downlink control signals or downlink data signals, to the UE 115-b using the communication link 125-b.

To mitigate interference caused in uplink transmissions by the UEs 115 using the same time-frequency resources, the network entity 105-a may transmit control signaling 230 to the UEs 115 indicating an M factor orthogonal cover coding configuration to apply to uplink grants for the UEs 115 that will be multiplexed in the same time-frequency resources. For example, the network entity 105-a may transmit second control signaling 235 that include uplink grants that schedule uplink transmissions 250 for the UE 115-a and the UE 115-b in the same time-frequency resources. The control signaling 230 may indicate a multiplexing order, a repetition configuration, and a respective orthogonal cover coding configuration to be applied to the uplink grants for the respective UEs 115. The repetition configuration may indicate a set of RVs, a quantity of REs associated with each RV of the set of RVs, and a quantity of RVs that are associated with each RV of the set of RVs. In some cases, the repetition configuration may be applied to all uplink transmissions for a given UE 115 (e.g., may be RRC configured for uplink transmissions for a given UE 115). In some cases, the repetition configuration may apply to a given indicated uplink grant.

Although OCC may mitigate interference at the network entity 105-a, OCC transmissions may also increase the time duration for transmitting the signals by increasing a quantity of repetitions transmitted for each signal. Thus, OCC transmissions may therefore be impacted by phase impairments caused by CFO. CFO may add a phase ramp in time to a transmitted signal. Thus, the longer a signal duration is (e.g., proportional to M), the more a phase of a signal may be distorted. This phase distortion may result in severe degradation in performance of the OCC.

CFO may be estimated by reference signals, such as DMRSs, or PTRSs. After CFO estimation, a receiving device (e.g., a network entity 105-a) may rely on the CFO estimation to nullify the impact of the detected CFO on the phase of the signal. Some DMRS configurations may not support effective CFO estimation, and may therefore damage the effectiveness of OCC transmissions (e.g., as described in greater detail with reference to FIG. 4). Some examples of DMRS configurations may not effectively estimate or mitigate the impact of CFO in systems using OCC configurations because orthogonality constraints in such DMRS settings may not tolerate CFO constraints. For instance, a DMRS OCC may be based on a Hadamard of length 16 and each DMRS may be separated by seven symbols. Such an OCC length and separation of DMRS may result in a pull-in range that is too small to effectively detect CFO and mitigate the effects of CFO. Techniques described herein support different reference signal (e.g., DMRS) schemes (e.g., different groupings and patterns of DMRS symbols) that support effective CFO estimation and OCC transmissions. For example, a DMRS distribution scheme described herein may be based on a clustered placement of reference signals, which may enable systems utilizing OCC transmissions to robustly estimate and mitigate CFO while retaining multiplexing gains offered by OCC.

Figure 3:
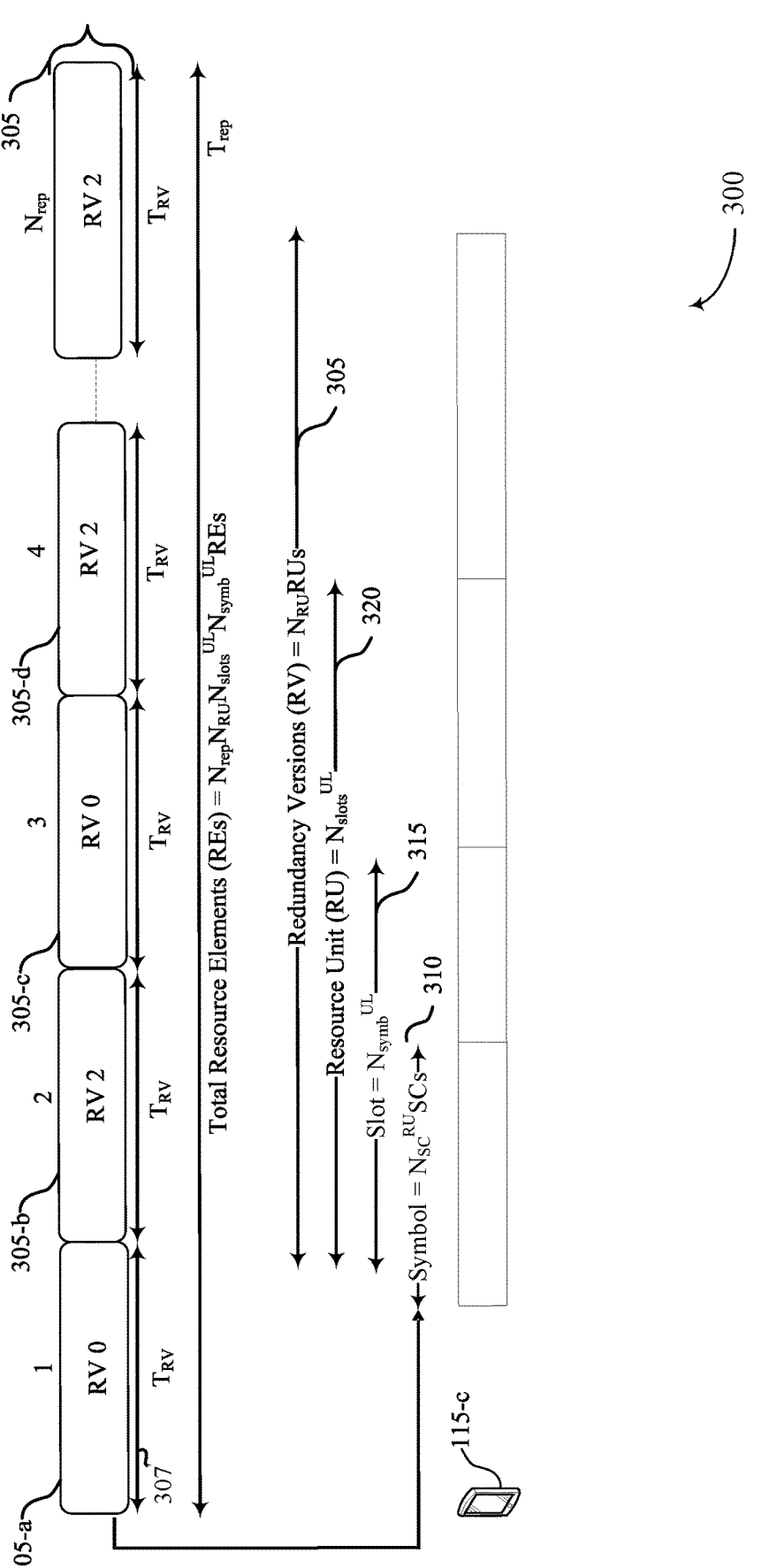
FIG. 3 shows an example of a resource configuration that supports reference signal designs for multiple access in uplink in accordance with one or more aspects of the present disclosure.

FIG. 3 shows an example of a resource configuration 300 that supports reference signal designs for multiple access in uplink in accordance with one or more aspects of the present disclosure (e.g., for each UE 115 that supports OCC techniques). A UE 115-*c*, as illustrated in FIG. 3, may be an example of the UE 115 described with respect to FIG. 1. The resource configuration illustrates a configuration of resources (e.g., REs) for an uplink grant for the UE 115-*c*. The resource configuration 300 may include multiple repetitions organized in accordance with RVs 305, such as a first RV 305-*a*, a second RV 305-*b*, a third RV 305-*c*, a fourth RV 305-*d*, up to N RVs 305, where N may be an integer. Each of the RVs may have a time duration 307, TRV. For example, each RV may include a quantity of REs. The various RVs 305 may cycle in an alternating or interleaving manner for transmission. For example, the first RV 305-*a* and the third RV 305-*c* correspond to RV 0 while the second RV 305-*b* and the fourth RV 305-*d* correspond to RV 2, and these RV 0s and RV 2s are transmitted in an alternating pattern cycle in respective slot time duration 307 using the first RV 305-*a* through the fourth RVs 305-*d*.

The resource configuration 300 may include a total set of REs including $$N_{sc}^{RU} \times \left( N_{rep} \times N_{RU} \times \left( N_{slots}^{UL} \times N_{symb}^{UL} \right) \right)$$

REs, where $N_{RU}$ indicates the quantity of resource units (RU) to which a transport block may be mapped, $N_{rep}$ indicates the quantity of repetitions of each of the transport blocks, the $$N_{slots}^{UL} \times N_{symb}^{UL}$$

may indicate the quantity of orthogonal frequency-division multiplexing (OFDM) symbols within a resource unit (e.g., quantity of REs within a resource unit). For example, an uplink grant may schedule an uplink transmission in the $$N_{sc}^{RU} \times \left( N_{rep} \times N_{RU} \times \left( N_{slots}^{UL} \times N_{symb}^{UL} \right) \right)$$

REs. The RV repetitions may include RV cycling, where each RV 305 includes $$N_{sc}^{RU} \times N_{RU} \times \left( N_{slots}^{UL} \times N_{symb}^{UL} \right)$$

(REs). An RV 305 may include multiple resource units 320, a resource unit 320 may include multiple slots 315, and a slot 315 may include multiple symbols 310.

In some examples, a DMRS may occur every seven symbols (e.g., once per slot). The DMRSs may be orthogonal per UE. DMRSs may be OCC'd with a Hadamard (e.g., an error-correcting code that may perform error detection and correction when transmitting messages over noisy or unreliable channels) of length 16. Each slot may include seven symbols (e.g., $$N_{symb}^{UL} = 7$$

(e.g., 6 data symbols and 1 DMRS symbol). Each RU may include 16 slots $$\left( \text{e.g., } N_{slots}^{UL} = 16 \right)$$

(e.g., 96 data symbols and 16 DMRS symbols). Each repetition (e.g., each RV) may include, for example 10 RUs (e.g., $N_{RU}=10$) (e.g., 960 data symbols and 160 DMRS symbols).

If the DMRSs are spread evenly across one or more RVs (e.g., one DMRS symbol per slot), then in some cases (e.g., in the case of OCC transmissions), longer transmissions over multiple repetitions may result in a CFO that cannot be detected or mitigated effectively (e.g., as described with reference to FIG. 4). Techniques described herein may support reference signal schemes (e.g., grouping of DMRS symbols) that enable systems with OCC to robustly estimate and mitigate CFO and retain the multiplexing gains offered by OCC.

Figure 4:
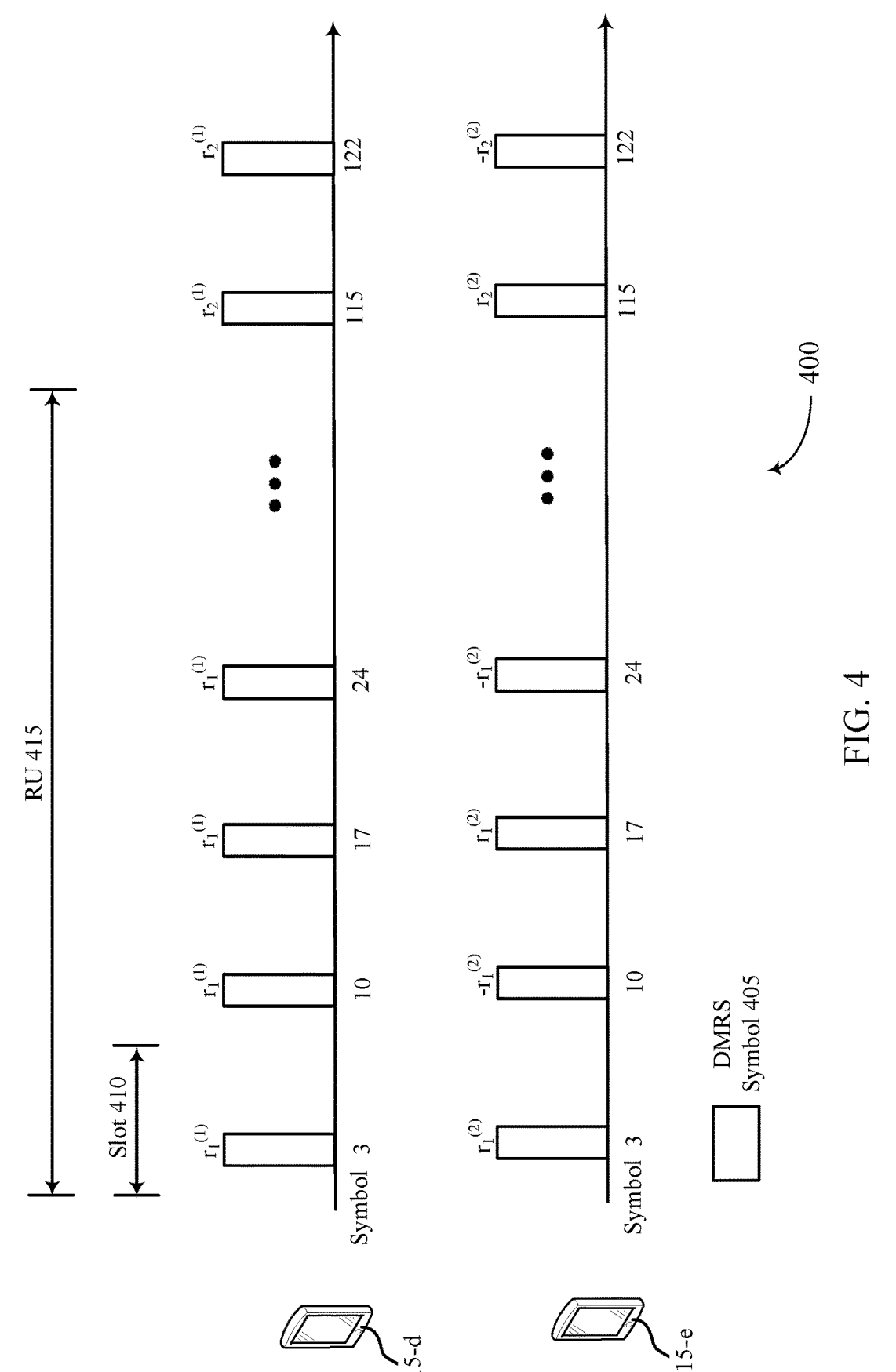
FIG. 4 shows an example of a timeline that supports reference signal designs for multiple access in uplink in accordance with one or more aspects of the present disclosure.

FIG. 4 shows an example of a timeline 400 that supports reference signal designs for multiple access in uplink in accordance with one or more aspects of the present disclosure. The timeline 400 may implement aspects of, or may be implemented by aspects of, the wireless communications system 100, the wireless communications system 200, or the resource configuration 300. For example, one or more devices (e.g., such as the UE 115-*d* and the UE 115-*e*, and a network entity 105) may communicate according to the timeline 400. Such devices may be examples of corresponding devices described with reference to FIGS. 1-3.

In some examples, one or more UEs 115 (e.g., the UE 115-*d* and the UE 115-*e*) may transmit uplink signaling (e.g., one or more repetitions) via a multiple access scheme. The UEs 115 may perform OCC to reduce interference at the receiving device (e.g., the network entity 105). The UEs 115 may also apply OCC to transmission of DMRSs (e.g., via one or more DMRS symbols 405). For example, an OCC in the DMRSs (e.g., across one or more RUs 415 using a Hadamard length of 16) may be used to extract signals from each UE 115 (e.g., by the network entity 105). Each DMRS (e.g., each DMRS symbol 405) may be separated by a quantity of symbols (e.g., 7 symbols). DMRSs may be located far apart from each other in time (e.g., 2 ms apart). Such a distance, and such a long OCC length of 16 may result in a small pull-in range, which may deteriorate performance of systems using OCC.

For instance, the RU 415 may have a duration of 32 ms, including 16 DMRSs with a UE-specific Hadamard code of length 16. Each DMRS symbol may correspond a value $$r_i^{(j)},$$

which denotes a DMRS number i at a UE j. Each slot 410 may include a DMRS symbol 405. For a 0.1 ppm CFO at 2 GHz (e.g., which may correspond to a CFO tolerance threshold for uplink transmissions in a non-terrestrial network), a CFO of 200 Hz may occur. Per symbol rotations may be defined as $$\frac{2\pi\epsilon n(N_{fft} + N_{cp})}{N_{fft}},$$

where $\epsilon=0.0533$ is a CFO/sub-carrier spacing (e.g., 3.75 kHz), and n represents a symbol index (e.g., a DMRS symbol number). For a 7% CP and a 200 Hz CFO, a pull-in range may be 17 symbols. A pull-in range may be defined as an amount of time (e.g., 17 symbols in such an example) outside of which there will be no phase coherence. That is, for a pull-in range of 17 symbols, there will be no phase coherence between any symbols that are located more than 17 symbols apart. Symbols that are not within a pull-in range cannot be combined (e.g., OCC transmissions across more than 17 symbols cannot be combined, rendering the OCC ineffective).

For example, a DMRS located in symbol 3 and a DMRS located in symbol 24 may have a phase difference of more than $2\pi$ (e.g., because symbol 3 and symbol 24 are outside of the pull-in range). Similarly, the DMRS symbol 10 and a DMRS symbol 31 may be outside of the pull-in range (e.g., the distance between the DMRS symbol 10 and the DMRS symbol 31 may exceed the pull-in range of 17 symbols). Thus, in the case of OCC'd DMRSs, the CFO may be so great that it cannot be mitigated effectively (e.g., the phase difference across DMRS symbols 405 within an RU 415 exceeds 2pi, in which case the CFO may not be effectively nullified). Because OCC transmissions result in an increased length of transmissions, DMRSs may be located outside of a pull-in range. Therefore, communication systems with such DMRS patterns may not be capable of using OCC and mitigating effects of CFO, which may result in the errors in the signaling.

Techniques described herein may support various reference signal schemes to support OCC transmissions with a measurable and nullifiable CFO. For instance, in some examples (e.g., instead of using a Hadamard of length 16), the DMRS distribution scheme may support OCC sequence of length M for DMRS (e.g., where M represents a quantity of UEs 115 multiplexed). Such a configuration (e.g., such a DMRS distribution scheme) may be particularly effective for a relatively small quantity of M (e.g., less than or equal to a threshold quantity of multiplexed UEs 115), and a relatively small CFO (e.g., a CFO value that is less than or equal to a CFO threshold). For instance, for a larger CFO (e.g., that exceeds the CFO threshold) it may be difficult to recover an originally transmitted signal from symbol 3 and symbol 10, because more CFO translates to more phase rotation, which may result in a loss of orthogonality. Similarly, for a large value of M (e.g., that exceeds a threshold quantity), larger separations in time between consecutive OCC symbols may result in more phase rotation caused by CFO, which may cause loss of orthogonality. For instance, for the UE 115-*d* and the UE 115-*e*, symbols 3 and 10 may be used to recover a transmitted signal. However, for four UEs 115, symbols 3, 10, 17, and 24 (e.g., covering a longer amount of time) may be combined to recover the original transmitted signal, resulting in more phase rotation and more loss in orthogonality.

In some examples, as described in greater detail with reference to FIG. 5, a DMRS distribution scheme may group the DMRS symbols 405 differently to support OCC transmissions without generating excessive CFO. In such examples, the network entity 105 may configure one or more UEs 115 with the DMRS distribution scheme indicating one or more clusters of DMRS symbols, each cluster defined by one or more groups of DMRS symbols.

Figure 5:
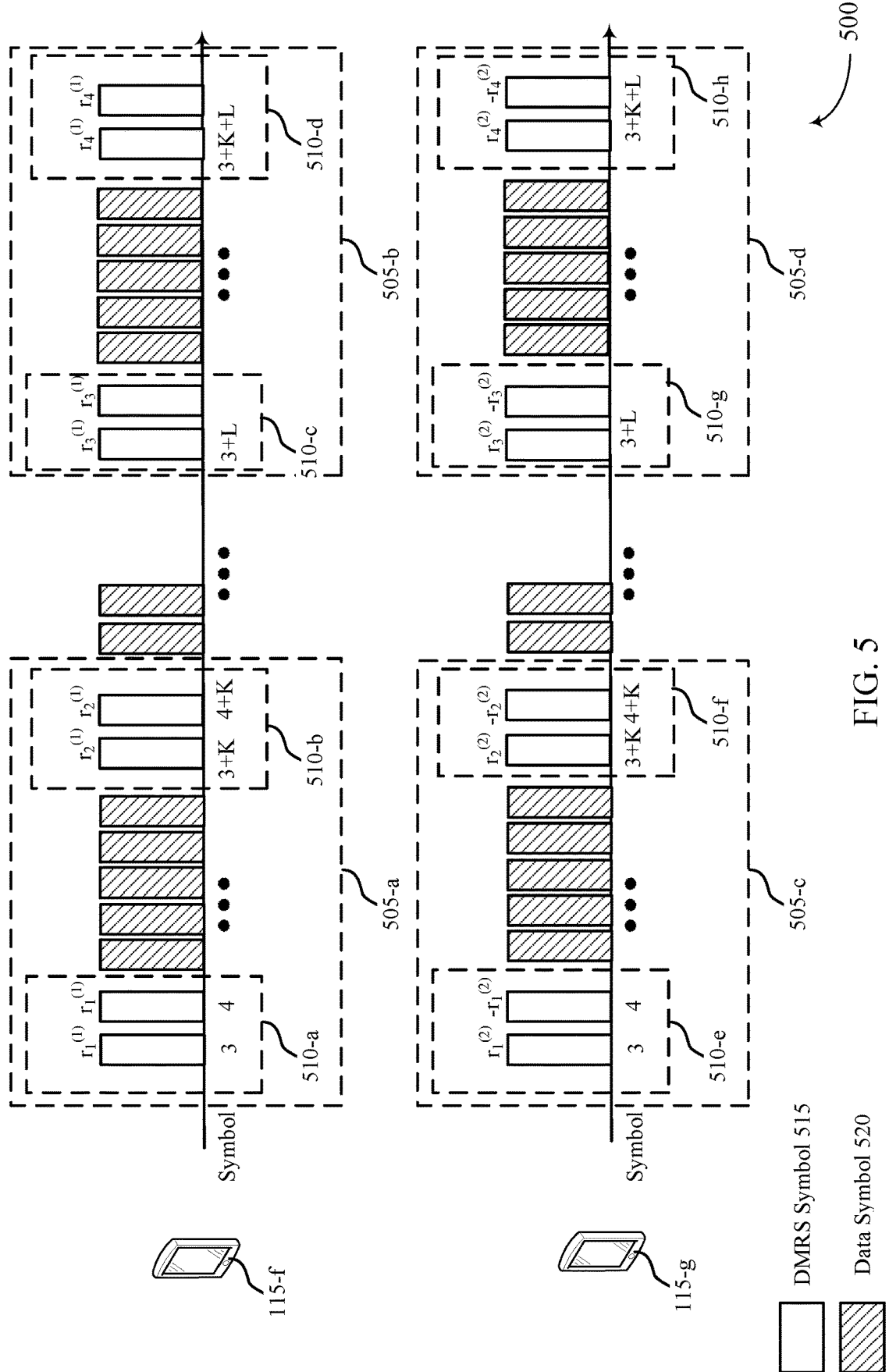
FIG. 5 shows an example of a timeline that supports reference signal designs for multiple access in uplink in accordance with one or more aspects of the present disclosure.

FIG. 5 shows an example of a timeline 500 that supports reference signal designs for multiple access in uplink in accordance with one or more aspects of the present disclosure. The timeline 500 may implement aspects of, or may be implemented by aspects of, the wireless communications system 100, the wireless communications system 200, the resource configuration 300, or the timeline 400. For example, one or more devices (e.g., such as the UE 115-*f* and the UE 115-*g*, and a network entity 105) may communicate according to the timeline 500. Such devices may be examples of corresponding devices described with reference to FIGS. 1-4.

A transmitting device (e.g., a UE 115, such as the UE 115-*f* and the UE 115-*g*) may transmit DMRSs according to a DMRS distribution scheme in which DMRSs are equi-spaced in clusters 505 of length 2×M (e.g., two groups 510 in each cluster 505 to calculate a raw CFO estimate, as described herein). In some examples, groups 510 may be referred to as copies (e.g., the group 510-*b* may be a copy of the group 510-*a*). Within each cluster 505, OCC'd copies (e.g., groups 510) may be separated by a factor of K. In some examples, K may represent a timing offset (e.g., a time duration, or a quantity of symbols)) between groups 510. The value of K may reduce errors by a factor of K. In some examples, K may be configured by the network entity 105, or selected to satisfy a threshold error.

In some examples, K may indicate a quantity of symbols between a first DMRS symbol 515 (e.g., symbol 3) of a first group 510-*a* in a cluster 505-*a* and a first DMRS symbol 515 (e.g., symbol 3+K) of a second group 510-*b* in cluster 505-*a*, or may indicate a timing offset or quantity of symbols between a last DMRS symbol 515 (e.g., symbol 4) of a first group 510-*a* in the cluster 505-*a* and a first DMRS symbol 515 (e.g., symbol 3+K) of a second group 510-*b* in the cluster 505-*a*. Similarly, the group 510-*c* of the cluster 505-*b* may include DMRS symbols 515 located at symbol 3+L, and the group 510-*d* of the cluster 505-*b* may include DMRS symbols 515 located at symbols 3+K+L. The UE 115-*g* may also transmit DMRSs via DMRS symbols 515 according to the DMRS distribution scheme. In some examples, the UE 115-*g* may monitor the same DMRS symbols 515 (e.g., the cluster 505-*c* and the cluster 505-*d* may be the same as the cluster 505-*a* and the cluster 505-*b*, respectively). In some examples, the UE 115-*g* may transmit the DMRSs via the DMRS symbols 515 via the group 510-*e* and the group 510-*f* of the cluster 505-*c*, and via the DMRS symbols 515 via the group 510-*g* and the group 510-*h* of the cluster 505-*d*.

Each cluster 505 (e.g., OCC copies of consecutive clusters 505) may be separated by a quantity of symbols (e.g., L symbols). L may be based at least in part on the quantity of UEs M, and/or a quantity of symbols per slot. For example, L may be twice the quantity of UEs being multiplexed (e.g., L=2M). In some examples, the DMRS symbols 515 may be separated by an additional time offset (e.g., a quantity of symbols between the DMRS symbols 515 of each group 510).

In some examples, the network entity 105 may configure each of the UEs 115 with the scheme for distributing the DMRSs as described herein. The network entity 105 may transmit control signaling indicating one or more parameter values, including a timing offset between clusters 505 (e.g., a value of L), a timing offset between groups 510 in the cluster 505 (e.g., a value of K), a quantity of UEs 115 (e.g., a value of M), a timing offset between symbols within each group 510 that communicate reference signals, or any combination thereof. The control signaling may include RRC signaling, a MAC-CE, DCI signaling, or any combination thereof. In some examples, OCC configuration information may be configured together for both data symbols 520 and DMRS symbols 515. In some examples, the network entity 105 may transmit first control signaling indicating OCC configuration information for data signaling, and second control signaling indicating OCC configuration information for DMRS signaling. In some examples, the network entity may transmit first control signaling indicating multiple candidate schemes for distributing DMRS symbols 515 (e.g., a lookup table indicating various combinations of parameter values, such as K, M, L, etc.). Second control signaling may indicate one of the candidate schemes for distributing DMRS symbols 515 (e.g., second control signaling may indicate a row in the lookup table).

In some examples, the UEs 115 may transmit data signaling via data symbols 520. Data symbols 520 may be interspersed between groups 510, or between clusters 505, or both. The data symbols 520 may correspond to a different OCC configuration than the DMRS symbols 515, or a single OCC configuration may apply to both the DMRS symbols 515 or data symbols 520.

DMRS distribution schemes may be based at least in part on a value of M. For instance, for M=4, each group 510 may include four DMRS symbols 515 followed by three data symbols 520. In such examples, DMRS symbols 515 may be located at, for example, symbols 3, 4, 5, and 6 in a first group 510-*a*, and at symbols 10, 11, 12, and 13 of a second group 510-*b* (e.g., with three data symbols 520 located between the first group 510-*a* and the second group 510-*b*). In such examples, L=7×2M=56 symbols.

Such techniques and DMRS distribution schemes, as described herein, may robustly estimate CFO because OCC copies (e.g., OCC DMRSs in multiple groups 510) may be distributed within an RU, instead of across RUs. Thus, the granularity of orthogonalization of the DMRSs may be decreased. A gap between clusters 505 (e.g., L=7×2M) may conserve DMRS overhead (e.g., may ensure that a ratio of symbols for reference signals versus symbols for data is at a desired level). Such gaps may be implemented, in some examples, in non-terrestrial networks, which may correspond to large coherence times. DMRS distribution schemes described herein may also result in some slots that do not include any DMRS symbols 515, while other slots may include multiple DMRSs (e.g., instead of a fixed one DMRS symbol 515 per slot). In some examples, slots may be reconfigured or redesigned to support homogeneity across time units. In some examples, coherence thresholds (e.g., requirements) for UEs may be defined to support one or more DMRS distribution schemes (e.g., depending on M and K).

The network entity 105 may configure the DMRS distribution scheme, and may receive the DMRSs and the data signaling according to the DMRS distribution scheme based at least in part on the OCC'd DMRSs, as described in greater detail with reference to FIG. 6.

Figure 6:
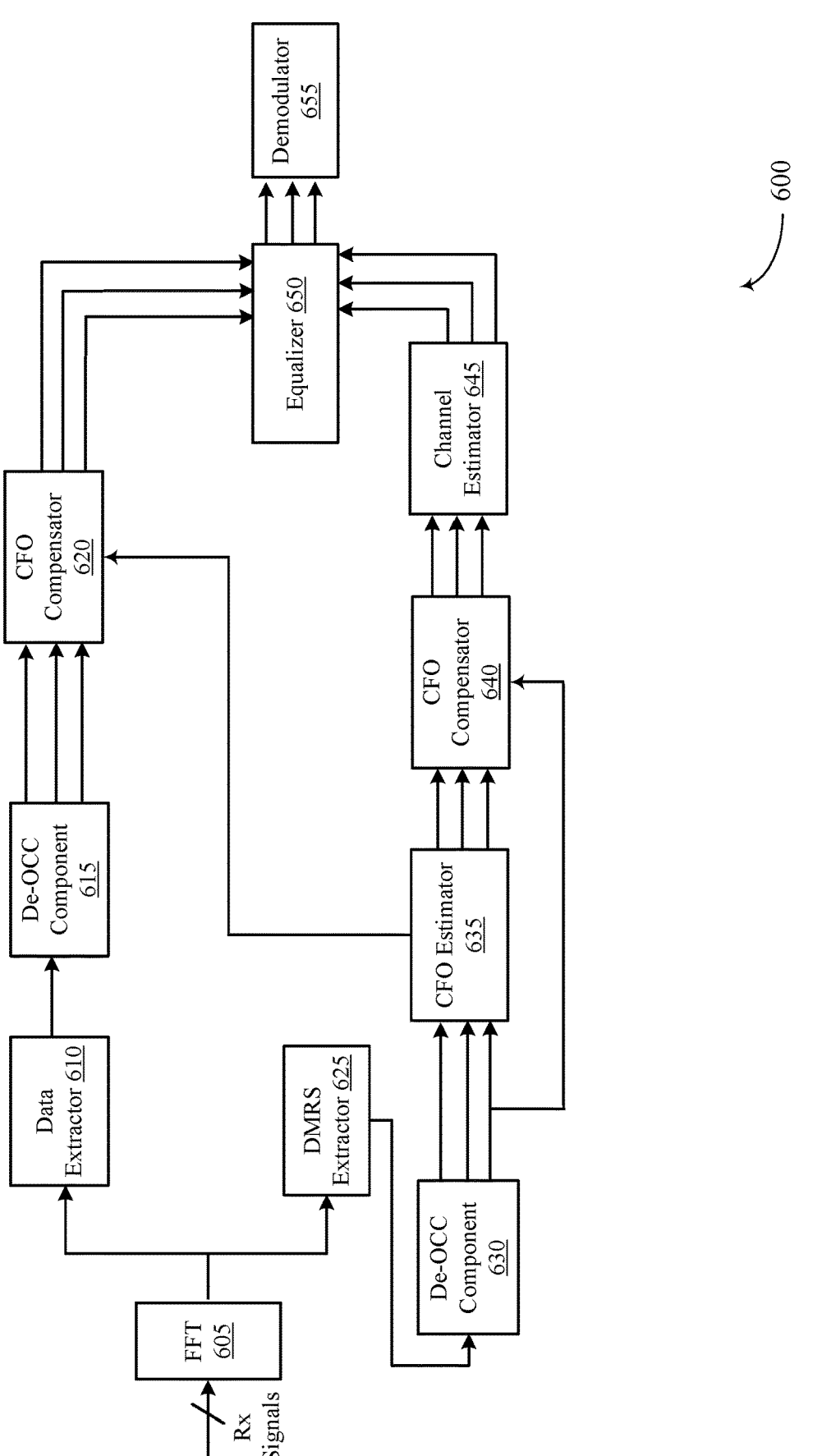
FIG. 6 shows an example of a flow diagram that supports reference signal designs for multiple access in uplink in accordance with one or more aspects of the present disclosure.

FIG. 6 shows an example of a flow diagram 600 that supports reference signal designs for multiple access in uplink in accordance with one or more aspects of the present disclosure. The flow diagram 600 may implement aspects of, or be implemented by aspects of, the wireless communications system 100, the wireless communications system 200, the resource configuration 300, the timeline 400, or the timeline 500. For example, one or more devices (e.g., such a UE 115 or a network entity 105) may communicate according to the flow diagram 600. For instance, a receiving device such as a network entity 105 may receive uplink signaling (e.g., including DMRSs via DMRS symbols 515 and data signals via data symbols 520) according to the flow diagram 600. Such devices may be examples of corresponding devices described with reference to FIGS. 1-5.

The network entity 105 may receive signals (e.g., including DMRSs and data signals) which may be input into an FFT 605. The DMRS extractor 625 may extract received DMRSs from the received signals. The de-OCC component 630 may receive signals from the DMRS extractor 625 and may de-OCC the DMRSs. The de-OCC component 630 may decode the OCC (e.g., across multiple repetitions of the transmission occurring over time). The CFO estimator 635 may estimate the CFO of the de-OCC'd DMRSs, and may send the CFO estimate to the CFO compensator 640. The de-OCC'd DMRSs determined by the de-OCC component 630 may also be sent to the CFO compensator (e.g., the network entity 105 may compensate for the CFO estimated by the CFO estimator 635 on the de-OCC'd DMRSs determined by the de-OCC component 630). The de-OCC'd DMRSs, as compensated for by the CFO compensator 640, may be sent to the channel estimator 645. A channel estimate generated by the channel estimator 645 may be input into the equalizer 650.

The data extractor 610 may extract data from the received signal. The de-OCC component 615 may de-OCC the extracted data. The CFO compensator 620 may compensate the de-OCC'd data signals according to the CFO estimate generated by the CFO estimator 635. The de-OCC'd data as compensated by the CFO compensator 620 may be input into the equalizer 650 (e.g., along with the channel estimate generated by the channel estimator 645). The output from the equalizer 650 may be provided to the demodulator 655 for demodulation of the data signaling.

De-OCC procedures and CFO estimation and compensation, as described with reference to FIG. 6, may be further described with reference to FIGS. 7-8. Such procedures may be applied for the DMRS distribution schemes described herein.

Figure 7:
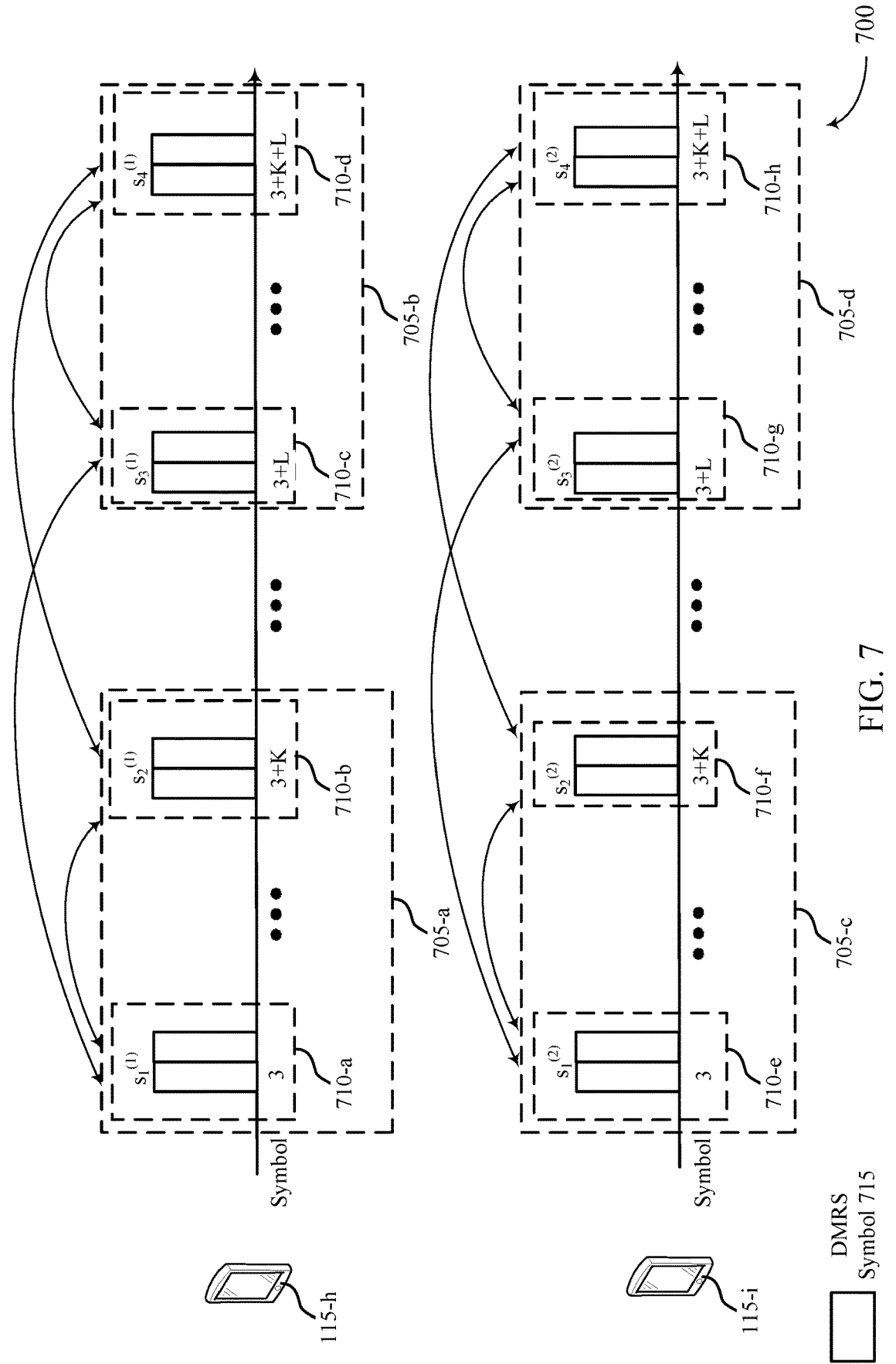
FIG. 7 shows an example of a timeline that supports reference signal designs for multiple access in uplink in accordance with one or more aspects of the present disclosure.

FIG. 7 shows an example of a timeline 700 that supports reference signal designs for multiple access in uplink in accordance with one or more aspects of the present disclosure. The timeline 700 may implement aspects of, or be implemented by aspects of, the wireless communications system 100, the wireless communications system 200, the resource configuration 300, the timeline 400, the timeline 500, or the flow diagram 600. For example, one or more devices (e.g., such as the UE 115-*h* and the UE 115-*i*, and a network entity 105) may communicate according to the timeline 700. Such devices may be examples of corresponding devices described with reference to FIGS. 1-6.

As described in greater detail with reference to FIG. 5, the network entity 105 may configure the UEs 115 (e.g., the UE 115-*h* and the UE 115-*i* for M=2). The techniques described herein may be adapted to support any quantity of UEs (e.g., M=2, 3, 4, 5, 6, 7, 8, 9). The network entity may transmit control signaling indicating a DMRS distribution scheme, which may indicate one or more timing offsets, among other examples (e.g., a timing offset K between groups 710 within each cluster 705, a timing offset L between clusters 705, a timing offset between one or more DMRS symbols 715, a quantity of UEs M, or any combination thereof). In some cases, the control signaling may include a starting symbol for DMRS distribution scheme. In some examples, for the UE 115-*h*, a group 710-*a* of cluster 705-*a* may include one or more DMRS symbols 715 beginning at symbol 3, and a group 710-*b* of cluster 705-*a* may include one or more DMRS symbols 715 beginning at symbol 3+K). The cluster 705-*b* may be separated in time from the cluster 705-*a* by a timing offset L. For the UE 115-*h*, a group 710-*c* of cluster 705-*b* may include one or more DMRS symbols 715 beginning at symbol 3+L, and a group 710-*d* of cluster 705-*b* may include one or more DMRS symbols 715 beginning at symbol 3+L+K). The UE 115-*i* may monitor the same resources or different resources for DMRSs (e.g., the cluster 705-*c* and the cluster 705-*d* may be the same as the cluster 705-*a* and the cluster 705-*b*, or may be different from the cluster 705-*a* and the cluster 705-*b*). For example, a group 710-*e* of cluster 705-*c* may include one or more DMRS symbols 715 beginning at symbol 3, and a group 710-*f* of cluster 705-*c* may include one or more DMRS symbols 715 beginning at symbol 3+K). The cluster 705-*d* may be separated in time from the cluster 705-*c* by a timing offset L. For the UE 115-*i*, a group 710-*g* of cluster 705-*d* may include one or more DMRS symbols 715 beginning at symbol 3+L, and a group 710-*h* of cluster 705-*d* may include one or more DMRS symbols 715 beginning at symbol 3+L+K).

The receiving device (e.g., the network entity 105) may de-OCC the DMRSs received via the DMRS symbols 715 based on the OCC of each UE 115 (e.g., the UE 115-*h* and the UE 115-*i*) according to a receiver architecture for CFO estimation and compensation described herein. For example, the network entity 105 may de-OCC the DMRSs within a group of a cluster of DMRSs. The de-OCC operation may involve a dot product operation with a respective UE identifier (e.g., which may be referred to as a respective UE signature). For instance, the orthogonal DMRS sequence of length M (e.g., where M indicates a quantity of UEs to be multiplexed) used by each UE 115 of a group of UEs may be used to determine the de-OCC'd DMRS copies for each respective UE 115. For instance, the network entity 105 may perform a dot product with a row of an OCC matrix assigned to a particular UE 115. The network entity may combine the M symbols from each group 710 to get 2 de-OCC'd symbols per cluster 705 (e.g., one de-OCC'd symbol per group 710 in each cluster). Each de-OCC'd symbol may be defined as a symbol $$s_i^{(j)}$$

indicating a de-OCC'd DMRS number (e.g., index) i at a UE j. For example, the network entity 105-*a* may combine the DMRS symbols 715 (e.g., located in symbol 3 and symbol 4 in the cluster 705-*a*) into one de-OCC'd symbol $$s_1^{(1)}$$

located at symbol 3, and may combine the DMRS symbol 715 (e.g., located at symbols 3+K and 4+K) into one de-OCC'd symbol $$s_2^{(1)}$$

located at symbol 3+K.

Having de-OCC'd the DMRSs, resulting in de-OCC'd symbols $$s_i^{(j)},$$

the network entity may generate a CFO estimate based on the de-OCC'd DMRSs for each UE 115. In some examples, the network entity may perform a multi-step CFO estimation, which may include generating a raw CFO estimate from each cluster, a refined CFO estimation across clusters, and a further refined estimation based on a local ML search around the refined CFO estimate.

For example, the network entity 105 may obtain the raw CFO estimation (e.g., a first CFO estimation) for each UE 115 by measuring phase rotation within each cluster 705. For instance, the network entity 105-*a* may compare a phase rotation of the group 710-*a* with a phase rotation of the group 710-*b* in cluster 705-*a* for the UE 115-*h*, and may also compare a phase rotation of the group 710-*c* and the group 710-*d* in the cluster 705-*b* for the UE 115-*h*, and may perform similar measurements for the UE 115-*i*. In such examples, the network entity 105 may determine a raw CFO estimate $$\theta_{raw}^{(j)}$$

for each UE j such that $$\theta_{raw}^{(j)} = \text{angle} \frac{\left( \sum_{i=1}^{N_{clusters}} s_{2i-1}^{(j)*} s_{2i}^{(j)} \right)}{K}$$

for a quantity of cluster 705 $N_{clusters}$. The network entity may then compensate the DMRSs $$s_i^{(j)}$$

by the raw CFO estimate $$\theta_{raw}^{(j)},$$

resulting in compensated DMRSs $$s_i'^{(j)}.$$

The network entity 105 may measure a phase rotation between corresponding groups 710 in clusters 705. For instance, the network entity 105 may measure a phase rotation between the group 710-*a* of the cluster 705-*a* and the group 710-*c* of the cluster 705-*b*, and may similarly measure a phase rotation between the group 710-*b* of the cluster 705-*a* and the group 710-*d* of the cluster 705-*b*. For example, the network entity 105-*a* may generate a refined CFO estimate $$\theta_{refined}^{(j)},$$

where $$\theta_{refined}^{(j)} = \frac{\text{angle}\left(\sum_{i=1}^{\frac{N}{M}-1} s_i'^{(j)} s_{i+1}'^{(j)}\right)}{L} \text{ for each } UE \ j.$$

The network entity 105 may further compensate the DMRSs compensated by the raw estimate $$s_i'^{(j)}$$

by the refined CFO estimate $$\theta_{refined}^{(j)}$$

(such that a compensation of the DMRSs may be represented as $$\theta_{refined}^{(j)} + \theta_{raw}^{(j)}.$$

The additionally compensated DMRSs may be referred to as additionally compensated DMRSs $$u_i^{(j)}.$$

The network entity 105 may further refine the CFO estimate according to one or more operations, such as a maximum likelihood (ML) estimator. In such examples, the network entity 105 may match a wave (e.g., a sinuous) with a given CFO to a compensated signal $$u_i^{(j)}.$$

The ML estimated CFO may be found by solving the following:

$$\theta_{ML}^{(j)} = \text{argmax}_{\theta_{ML}^{(j)} \in [-\Theta, \Theta]} \left| \sum_{i=1}^{\frac{N}{M}} \exp\left(j\theta_{ML}^{(j)} n[i]\right) u_i^{(j)*} \right|^2,$$

where n[i] represents a symbol index corresponding to a DMRS symbol number i, and where $j=\sqrt{-1}$ in the exponential (e.g., not the same as a UE index j). The ML estimated CFO $$\theta_{ML}^{(j)}$$

may support an ultra-refined estimate of the CFO at the cost of increased complexity, where complexity depends on a range of $[-\Theta, \Theta]$.

A final CFO estimate (e.g., a total or complete CFO estimate) at each UE j may be defined as $$CFO_j = \theta_{raw}^{(j)} + \theta_{refined}^{(j)} + \theta_{ML}^{(j)}.$$

The network entity 105 may compensate the de-OCC'd DMRSs using the final CFO estimate. The network entity 105 may send the de-OCC'd DMRSs to channel estimation (e.g., to a channel estimator 645). The network entity 105 may further de-OCC received data (e.g., via data symbols interspersed between groups 710 or between clusters 705 or both). The network entity 105 may compensate for the CFO in the de-OCC'd data (e.g., using the CFO compensator 620 and/or the CFO compensator 640) before demodulation (e.g., at the demodulator 655), and may then send the demodulated data for log likelihood ratio (LLR) calculation and channel decoding.

Figure 8:
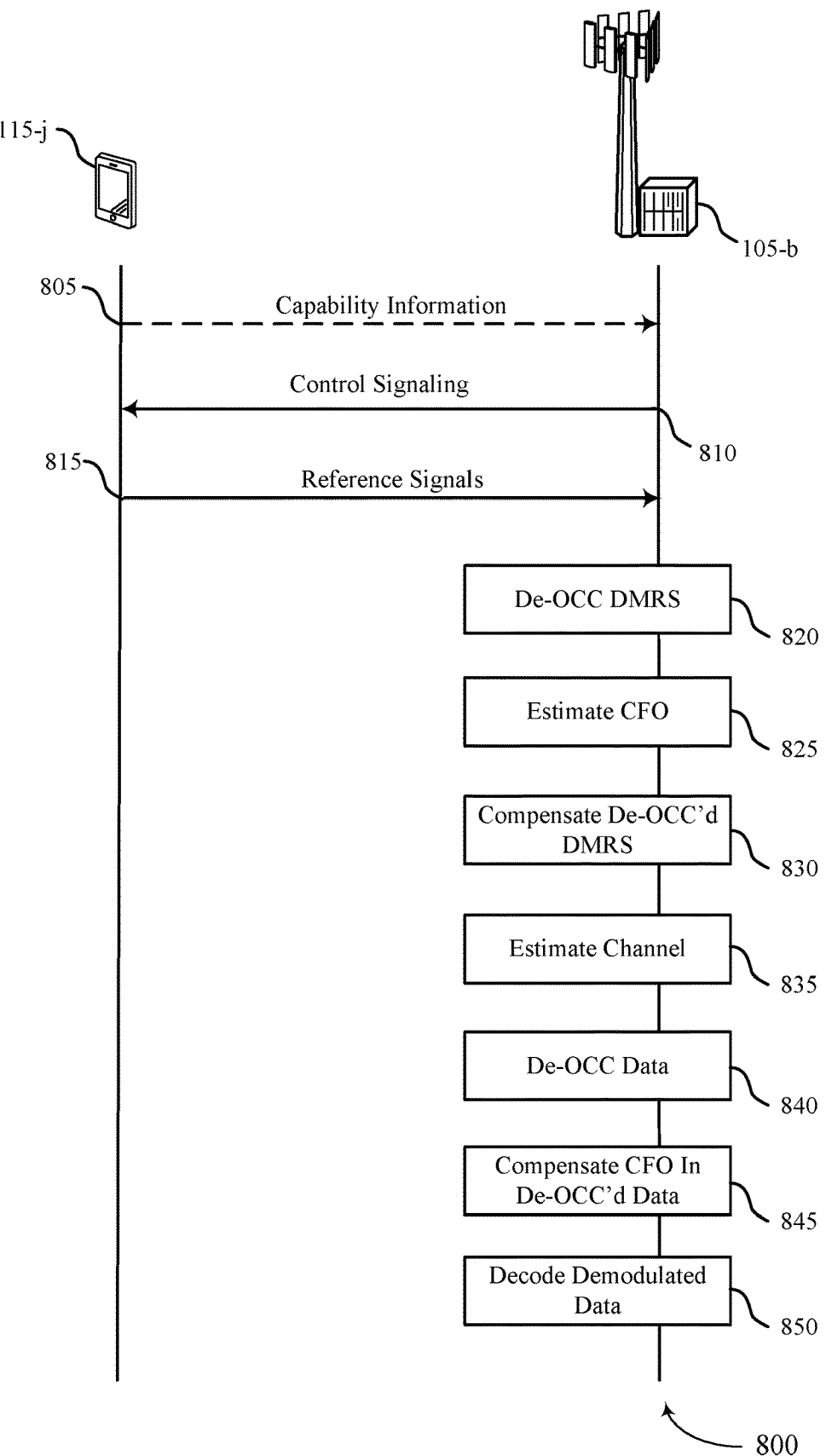
FIG. 8 shows an example of a process flow that supports reference signal designs for multiple access in uplink in accordance with one or more aspects of the present disclosure.

FIG. 8 shows an example of a process flow 800 that supports reference signal designs for multiple access in uplink in accordance with one or more aspects of the present disclosure. The process flow 800 may implement, or may be implemented by, aspects of the wireless communications system 100, the wireless communications system 200, the resource configuration 300, the timeline 400, the timeline 500, the flow diagram 600, or the timeline 700. For example, the process flow 800 may include a network entity 105-*b* and one or more UEs 115 (e.g., M UEs, including the UE 115-*j*).

At 805, the UE 115-*j* may transmit a message (e.g., to the network entity 105-*b*) indicating that the UE 115-*j* supports multiplexing. For example, the message may include capability information. The capability for multiplexing may depend on the phase coherence capabilities associated with the UE. In some examples, the message may be a coherence report.

At 810, the network entity 105-*b* may transmit (e.g., to one or more UEs 115 including the UE 115-*j*), control signaling including an indication of a scheme for distributing reference signals (e.g., DMRSs) over resources that are multiplexed to communicate signals for multiple UEs 115 including the UE 115-*j* using OCCs. The scheme (e.g., a DMRS distribution scheme) may indicate multiple clusters of the reference signals, each cluster including one or more groups of the reference signals. Each group may include a set of reference signals associated with each UE 115 of the multiple UEs 115. The scheme indicates a first timing offset between each cluster (e.g., K) and a second timing offset between each group (e.g., L), or any combination thereof. In some examples, the control signaling may include an indication of the quantity of UEs (e.g., M). The control signaling may include an indication of an OCC codeword or multiple OCC codewords.

In some examples, the control signaling may include an indication of a third timing offset between reference signals in each group. The network entity 105-*b* may transmit the control signaling at 810 based on receiving the capability information at 805. The control signaling may be an example of an RRC message, a MAC-CE message, and/or a DCI among other examples, and may indicate UE-specific details regarding the DMRS configuration to be used. As described herein, the control signaling may inform the UE regarding a multiplexing order M based on coherence reported from the UE 115-*j*, DMRS configuration parameters (e.g., symbol indices, K, and L), codewords assigned to each UE 115 for multiplexing, or any combination thereof. In some examples, the control signaling may include a first control message (e.g., RRC signaling) configuring multiple candidate reference signal schemes (e.g., multiple values for configuration parameters, codewords, values of M, etc.). A second control message (e.g., a MAC-CE message or DCI message) may indicate one of the multiple candidate reference signal schemes.

At 820, the network entity 105-*b* may de-OCC the reference signals received at 815 (e.g., decode the OCC for the DMRSs). For example, the network entity 105-*b* may perform, for each cluster, a dot product for each row of a matrix of an OCC corresponding to the one or more reference signals for the multiple UEs 115, each row of the matrix corresponding to a respective UE 115 of the multiple UEs 115. The network entity may generate, based on the dot product, a combined symbol for which the OCC has been decoded for each group of each cluster by combining a quantity of symbols corresponding to a quantity of the multiple UEs 115 for each group of each cluster.

At 825, the network entity 105-*b* may perform a CFO estimation for each UE 115 (e.g., including the UE 115-*j*) based on the de-OCC'd DMRSs. The CFO estimation may be a multi-step or multi-phase CFO estimation. For example, as described in greater detail with reference to FIG. 8, the network entity 105-*b* may generate a first CFO estimate (e.g., a raw CFO estimate) based at least in part on measuring a phase rotation between at least a first group and a second group of the multiple groups within at least a first cluster of the multiple clusters. The network entity 105-*b* may generate a second CFO estimate (e.g., a refined CFO estimate) based on measuring a phase rotation between respective groups across clusters (e.g., a first group of the first cluster and a first group of the second cluster, a second group of the first cluster and a second group of the second cluster, etc.). The network entity 105-*b* may generate a third CFO estimate (e.g., a further refined CFO estimate) by applying a likelihood estimator (e.g., an ML estimator) to the CFO value corresponding to the reference signals compensated by the first CFO estimate and the second CFO estimate. A total CFO estimate may be based on the first CFO estimate, the second CFO estimate, and the third CFO estimate. In some examples, at each step, the calculated CFO in its respective stages may be compensated prior to proceeding with a next step. For example, the second CFO estimate may be based on a compensation of the first CFO estimate, and the third CFO estimate may be based on a compensation of the second CFO estimate, etc.

At 830, the network entity 105-*b* may compensate the de-OCC'd reference signals based on the total CFO estimate. At 835, the network entity 105-*b* may perform a channel estimation based on the compensated reference signals.

At 840, the network entity 105-*b* may de-OCC data received from one or more UEs 115. For example, the network entity 105-*b* may receive data via data symbols interspersed between the groups of each cluster between clusters, or both, and may decode the OCC corresponding to the data based on the compensated reference signals and the de-OCC'd reference signals. At 845, the network entity 105-*b* may compensate the data signaling according to the CFO estimate and the de-OCC'd data signaling, demodulate the compensated data signaling, and send the demodulated data to a channel decoder. At 850, the network entity 105-*b* may decode the demodulated data.

Figure 9:
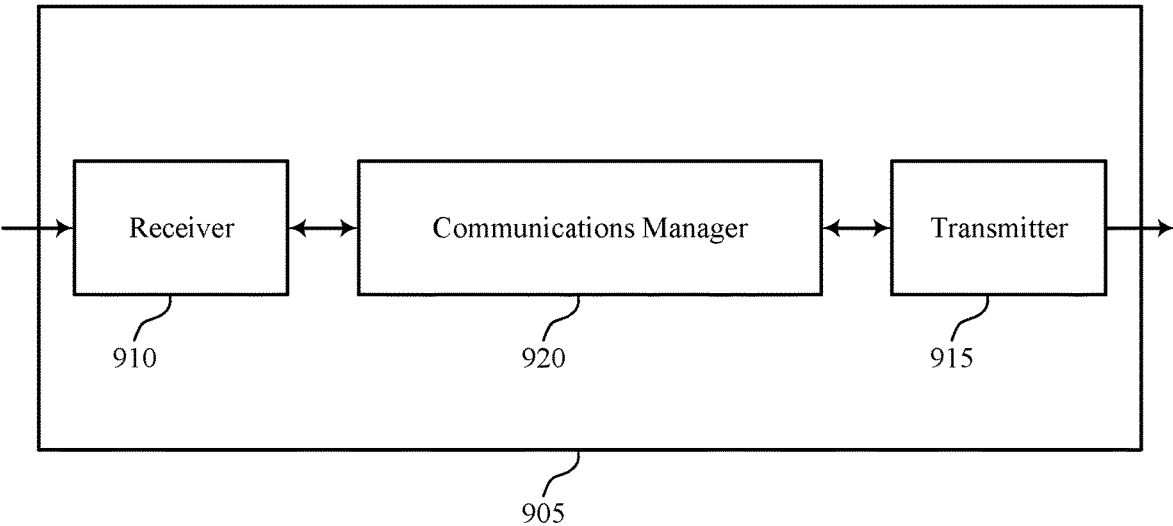
FIGS. 9 and 10 show block diagrams of devices that support reference signal designs for multiple access in uplink in accordance with one or more aspects of the present disclosure.

FIG. 9 shows a block diagram 900 of a device 905 that supports reference signal designs for multiple access in uplink in accordance with one or more aspects of the present disclosure. The device 905 may be an example of aspects of a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to reference signal designs for multiple access in uplink). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reference signal designs for multiple access in uplink). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of reference signal designs for multiple access in uplink as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. For example, the communications manager 920 is capable of, configured to, or operable to support a means for receiving control signaling including an indication of a scheme for distributing reference signals over resources that are multiplexed to communicate signals for multiple UEs including the UE using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The communications manager 920 is capable of, configured to, or operable to support a means for transmitting one or more reference signals from the multiple UEs according to the scheme.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reference signal distribution and transmissions that support OCC transmissions and CFO estimation, resulting in improved reliability of transmissions and improved channel estimation, improved throughput, and decreased system latency.

Figure 10:
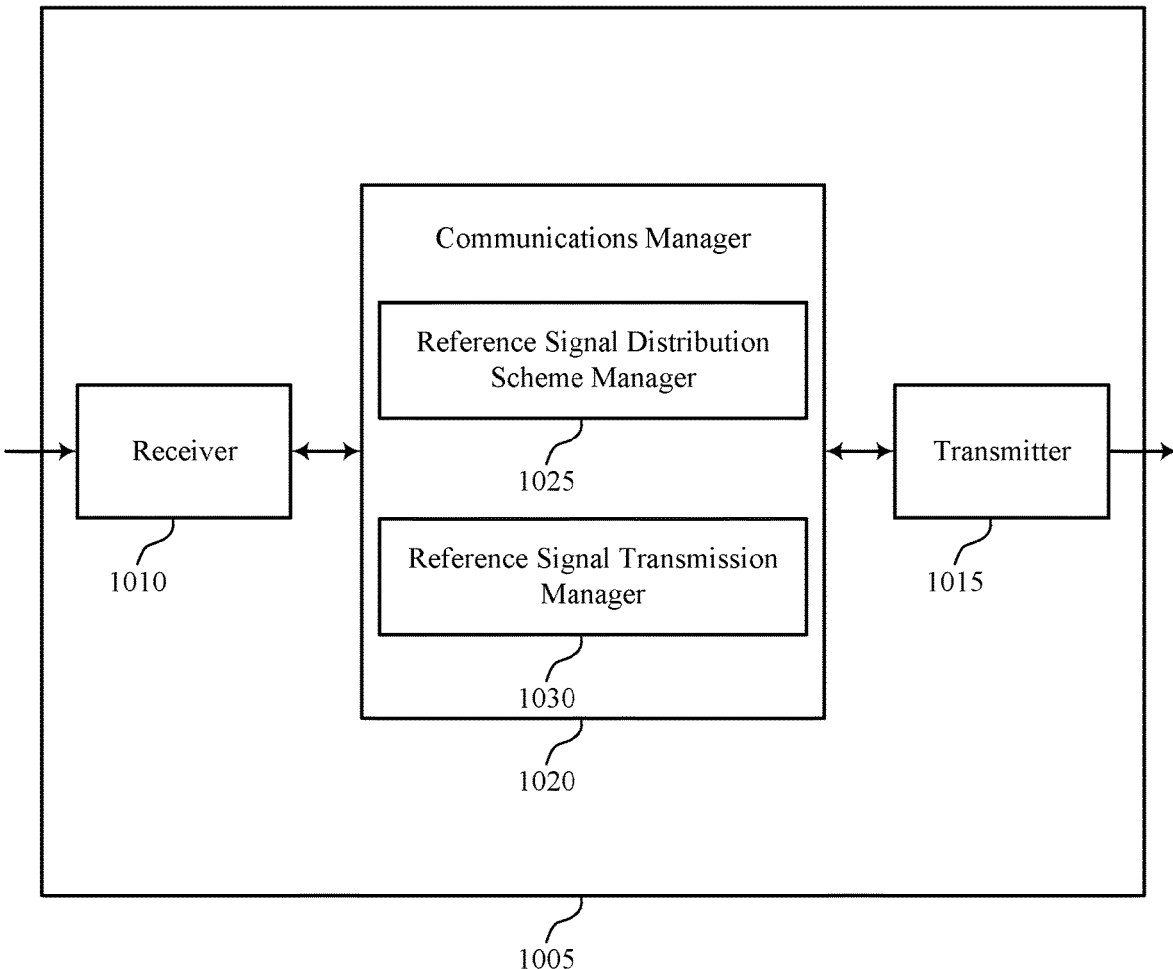

FIG. 10 shows a block diagram 1000 of a device 1005 that supports reference signal designs for multiple access in uplink in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to reference signal designs for multiple access in uplink). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to reference signal designs for multiple access in uplink). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of reference signal designs for multiple access in uplink as described herein. For example, the communications manager 1020 may include a reference signal distribution scheme manager 1025 a reference signal transmission manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. The reference signal distribution scheme manager 1025 is capable of, configured to, or operable to support a means for receiving control signaling including an indication of a scheme for distributing reference signals over resources that are multiplexed to communicate signals for multiple UEs including the UE using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The reference signal transmission manager 1030 is capable of, configured to, or operable to support a means for transmitting one or more reference signals from the multiple UEs according to the scheme.

Figure 11:
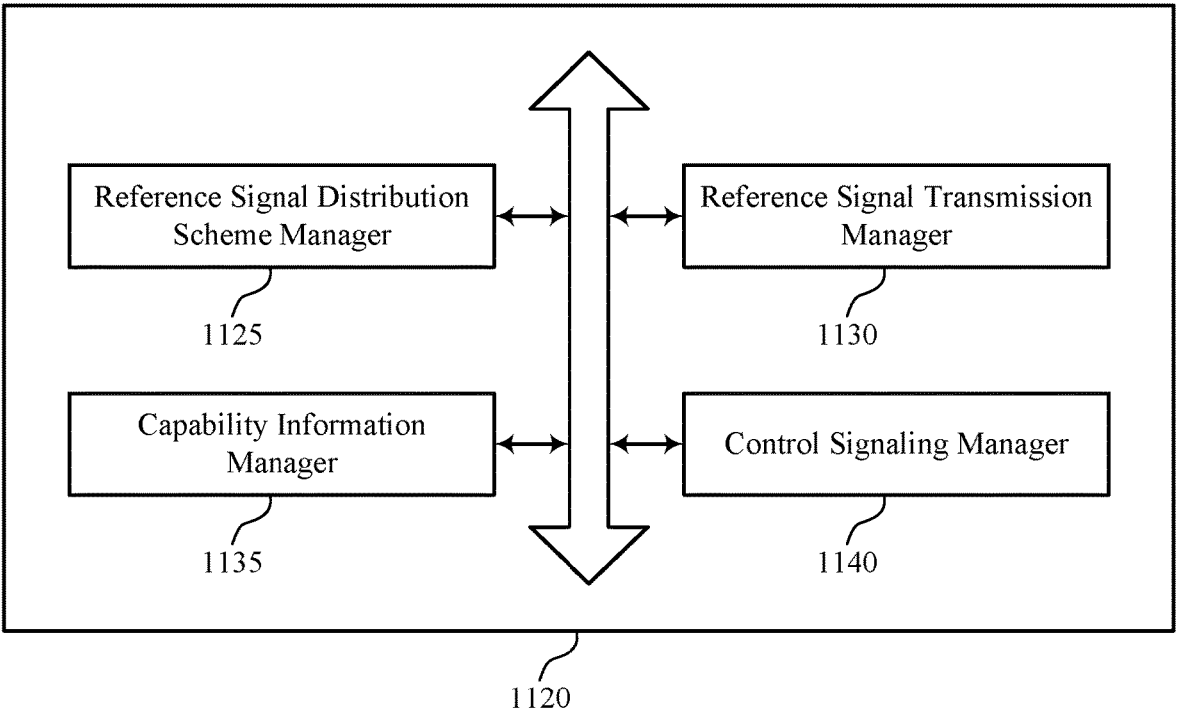
FIG. 11 shows a block diagram of a communications manager that supports reference signal designs for multiple access in uplink in accordance with one or more aspects of the present disclosure.
Figure 11:
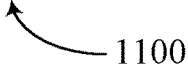

FIG. 11 shows a block diagram 1100 of a communications manager 1120 that supports reference signal designs for multiple access in uplink in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of reference signal designs for multiple access in uplink as described herein. For example, the communications manager 1120 may include a reference signal distribution scheme manager 1125, a reference signal transmission manager 1130, a capability information manager 1135, a control signaling manager 1140, or any combination thereof. Each of these components, or components or subcomponents thereof (e.g., one or more processors, one or more memories), may communicate, directly or indirectly, with one another (e.g., via one or more buses).

The communications manager 1120 may support wireless communications at a UE in accordance with examples as disclosed herein. The reference signal distribution scheme manager 1125 is capable of, configured to, or operable to support a means for receiving control signaling including an indication of a scheme for distributing reference signals over resources that are multiplexed to communicate signals for multiple UEs including the UE using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The reference signal transmission manager 1130 is capable of, configured to, or operable to support a means for transmitting one or more reference signals from the multiple UEs according to the scheme.

In some examples, the reference signal distribution scheme manager 1125 is capable of, configured to, or operable to support a means for receiving, via the control signaling, an indication of a quantity of the multiple UEs, an orthogonal cover code codeword corresponding to the orthogonal cover codes, or both.

In some examples, the reference signal distribution scheme manager 1125 is capable of, configured to, or operable to support a means for receiving, via the control signaling, an indication of a third timing offset between reference signals in each group of the set of multiple groups.

In some examples, the capability information manager 1135 is capable of, configured to, or operable to support a means for transmitting a coherence report, capability information indicating that the UE supports multiplexing, or both, where receiving the control signaling is based on transmitting the coherence report, the capability information, or both.

In some examples, to support receiving the control signaling, the control signaling manager 1140 is capable of, configured to, or operable to support a means for receiving a first control message including an indication of a set of multiple schemes for distributing reference signals over the resources that are multiplexed to communicate the signals for the multiple UEs using the orthogonal cover codes, the set of multiple schemes including the scheme. In some examples, to support receiving the control signaling, the control signaling manager 1140 is capable of, configured to, or operable to support a means for receiving a second control message indicating the scheme from the set of multiple schemes.

Figure 12:
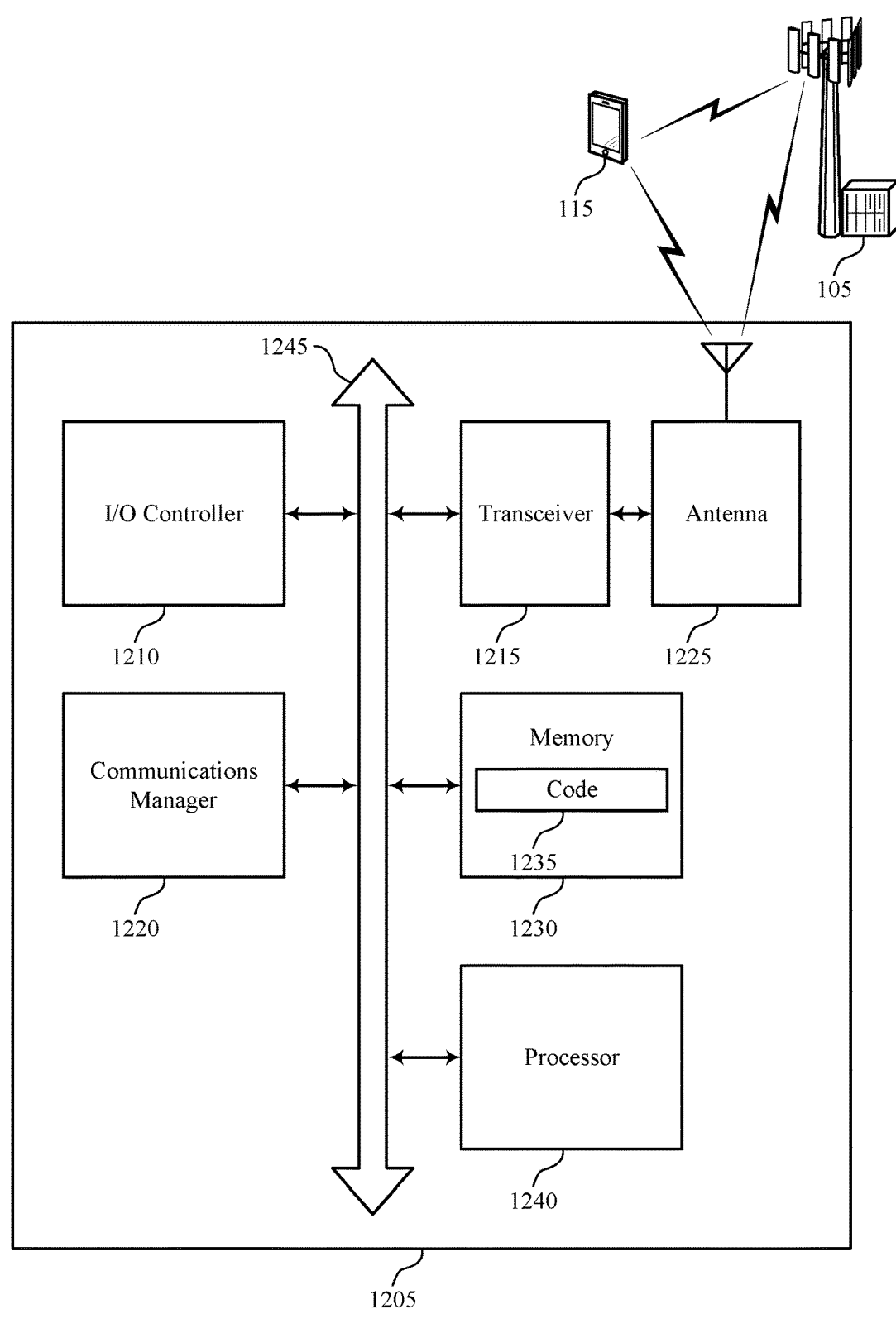
FIG. 12 shows a diagram of a system including a device that supports reference signal designs for multiple access in uplink in accordance with one or more aspects of the present disclosure.

FIG. 12 shows a diagram of a system 1200 including a device 1205 that supports reference signal designs for multiple access in uplink in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, at least one memory 1230, code 1235, and at least one processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of one or more processors, such as the at least one processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The at least one memory 1230 may include random access memory (RAM) and read-only memory (ROM). The at least one memory 1230 may store computer-readable, computer-executable code 1235 including instructions that, when executed by the at least one processor 1240, cause the device 1205 to perform various functions described herein. The code 1235 may be stored in a non-transitory computer-readable medium such as system memory or another type of memory. In some cases, the code 1235 may not be directly executable by the at least one processor 1240 but may cause a computer (e.g., when compiled and executed) to perform functions described herein. In some cases, the at least one memory 1230 may contain, among other things, a basic I/O system (BIOS) which may control basic hardware or software operation such as the interaction with peripheral components or devices.

The at least one processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1240 may be configured to operate a memory array using a memory controller. In some other cases, a memory controller may be integrated into the at least one processor 1240. The at least one processor 1240 may be configured to execute computer-readable instructions stored in a memory (e.g., the at least one memory 1230) to cause the device 1205 to perform various functions (e.g., functions or tasks supporting reference signal designs for multiple access in uplink). For example, the device 1205 or a component of the device 1205 may include at least one processor 1240 and at least one memory 1230 coupled with or to the at least one processor 1240, the at least one processor 1240 and at least one memory 1230 configured to perform various functions described herein. In some examples, the at least one processor 1240 may include multiple processors and the at least one memory 1230 may include multiple memories. One or more of the multiple processors may be coupled with one or more of the multiple memories, which may, individually or collectively, be configured to perform various functions herein.

The communications manager 1220 may support wireless communications at a UE in accordance with examples as disclosed herein. For example, the communications manager 1220 is capable of, configured to, or operable to support a means for receiving control signaling including an indication of a scheme for distributing reference signals over resources that are multiplexed to communicate signals for multiple UEs including the UE using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The communications manager 1220 is capable of, configured to, or operable to support a means for transmitting one or more reference signals from the multiple UEs according to the scheme.

By including or configuring the communications manager 1220 in accordance with examples as described herein, the device 1205 may support techniques for reference signal distribution and transmissions that support OCC transmissions and CFO estimation, resulting in improved reliability of transmissions and improved channel estimation, more efficient utilization of communication resources, decreased signaling errors, improved throughput, and decreased system latency.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the at least one processor 1240, the at least one memory 1230, the code 1235, or any combination thereof. For example, the code 1235 may include instructions executable by the at least one processor 1240 to cause the device 1205 to perform various aspects of reference signal designs for multiple access in uplink as described herein, or the at least one processor 1240 and the at least one memory 1230 may be otherwise configured to, individually or collectively, perform or support such operations.

Figure 13:
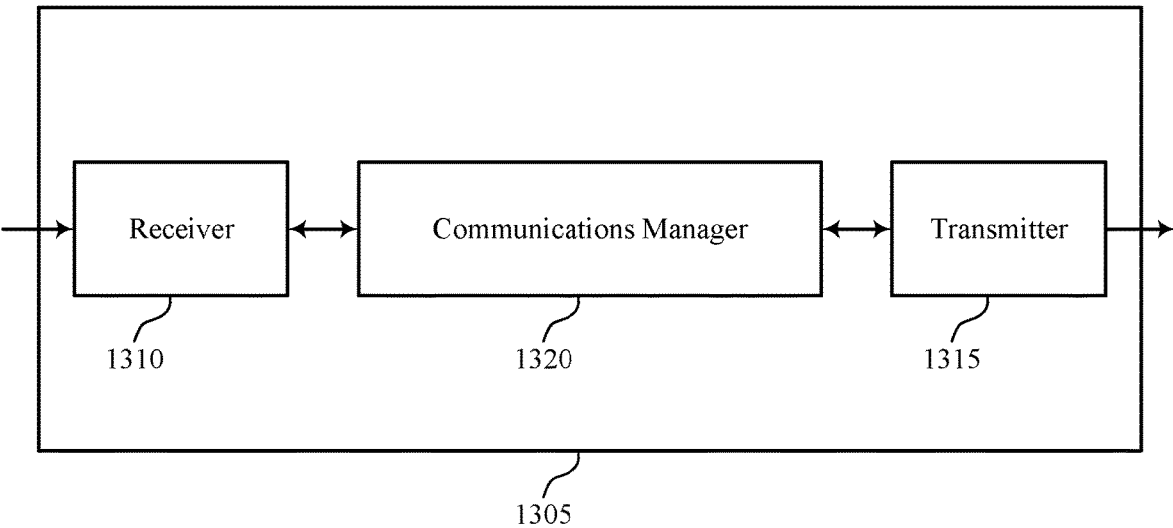
FIGS. 13 and 14 show block diagrams of devices that support reference signal designs for multiple access in uplink in accordance with one or more aspects of the present disclosure.

FIG. 13 shows a block diagram 1300 of a device 1305 that supports reference signal designs for multiple access in uplink in accordance with one or more aspects of the present disclosure. The device 1305 may be an example of aspects of a network entity 105 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to, individually or collectively, support or enable the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of reference signal designs for multiple access in uplink as described herein. For example, the communications manager 1320, the receiver 1310, the transmitter 1315, or various combinations or components thereof may be capable of performing one or more of the functions described herein.

In some examples, the communications manager 1320, the receiver 1310, the transmitter 1315, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1320, the receiver 1310, the transmitter 1315, or various combinations or components thereof may be implemented in code (e.g., as communications management software or firmware) executed by at least one processor. If implemented in code executed by at least one processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. For example, the communications manager 1320 is capable of, configured to, or operable to support a means for transmitting control signaling including an indication of a scheme for distributing reference signals over resources that are multiplexed to communicate signals for multiple user equipments (UEs) using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The communications manager 1320 is capable of, configured to, or operable to support a means for receiving one or more reference signals from the multiple UEs according to the scheme.

By including or configuring the communications manager 1320 in accordance with examples as described herein, the device 1305 (e.g., at least one processor controlling or otherwise coupled with the receiver 1310, the transmitter 1315, the communications manager 1320, or a combination thereof) may support techniques for reference signal distribution and transmissions that support OCC transmissions and CFO estimation, resulting in improved reliability of transmissions and improved channel estimation, improved throughput, and decreased system latency.

Figure 14:
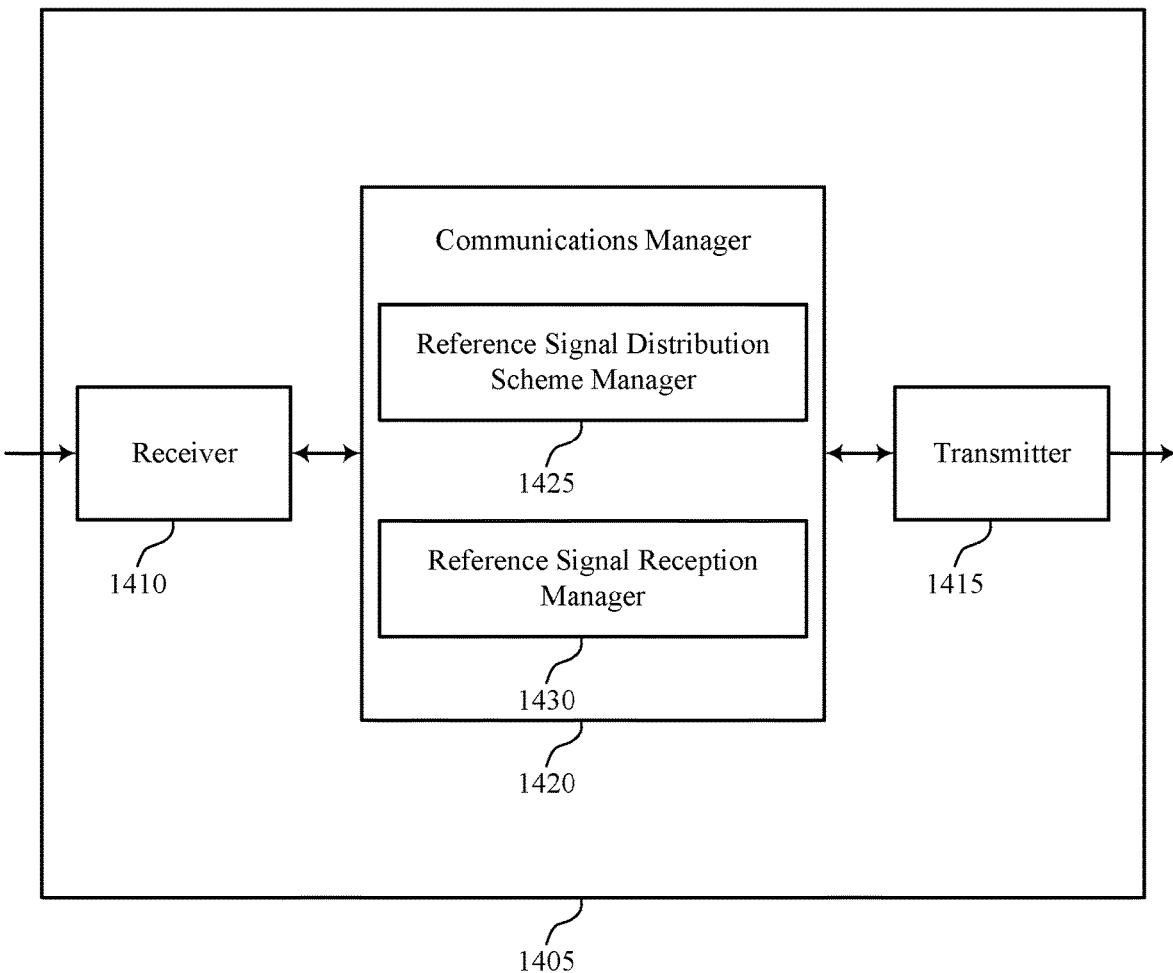

FIG. 14 shows a block diagram 1400 of a device 1405 that supports reference signal designs for multiple access in uplink in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405, or one of more components of the device 1405 (e.g., the receiver 1410, the transmitter 1415, and the communications manager 1420), may include at least one processor, which may be coupled with at least one memory, to support the described techniques. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of reference signal designs for multiple access in uplink as described herein. For example, the communications manager 1420 may include a reference signal distribution scheme manager 1425 a reference signal reception manager 1430, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a network entity in accordance with examples as disclosed herein. The reference signal distribution scheme manager 1425 is capable of, configured to, or operable to support a means for transmitting control signaling including an indication of a scheme for distributing reference signals over resources that are multiplexed to communicate signals for multiple user equipments (UEs) using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The reference signal reception manager 1430 is capable of, configured to, or operable to support a means for receiving one or more reference signals from the multiple UEs according to the scheme.

Figure 15:
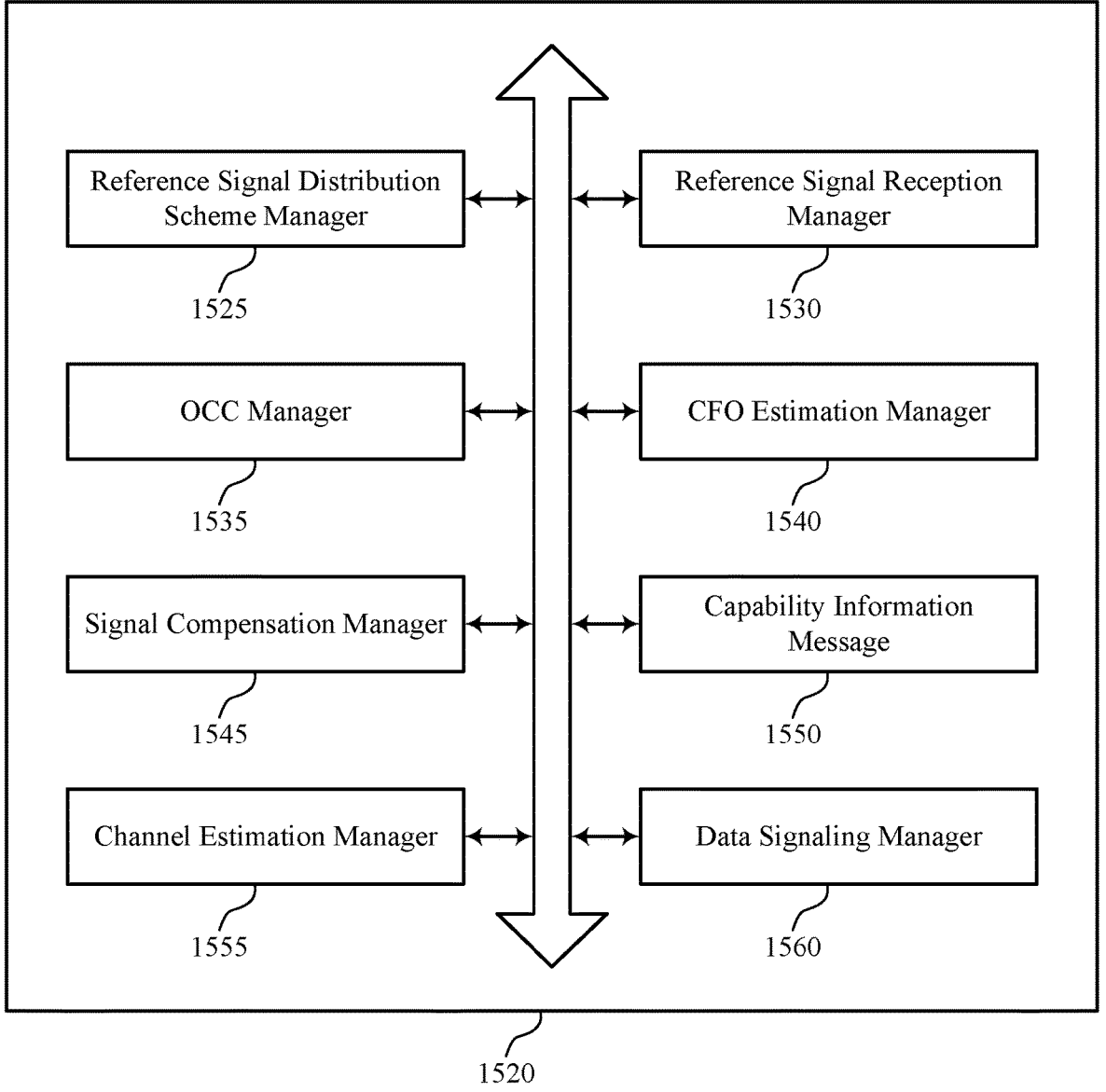
FIG. 15 shows a block diagram of a communications manager that supports reference signal designs for multiple access in uplink in accordance with one or more aspects of the present disclosure.

FIG. 15 shows a block diagram 1500 of a communications manager 1520 that supports reference signal designs for multiple access in uplink in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of reference signal designs for multiple access in uplink as described herein. For example, the communications manager 1520 may include a reference signal distribution scheme manager 1525, a reference signal reception manager 1530, a OCC manager 1535, a CFO estimation manager 1540, a signal compensation manager 1545, a capability information message 1550, a channel estimation manager 1555, a data signaling manager 1560, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communications at a network entity in accordance with examples as disclosed herein. The reference signal distribution scheme manager 1525 is capable of, configured to, or operable to support a means for transmitting control signaling including an indication of a scheme for distributing reference signals over resources that are multiplexed to communicate signals for multiple user equipments (UEs) using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The reference signal reception manager 1530 is capable of, configured to, or operable to support a means for receiving one or more reference signals from the multiple UEs according to the scheme.

In some examples, the OCC manager 1535 is capable of, configured to, or operable to support a means for decoding an orthogonal cover code corresponding to the one or more reference signals for the multiple UEs based on receiving the one or more reference signals according to the scheme.

In some examples, the CFO estimation manager 1540 is capable of, configured to, or operable to support a means for performing a carrier frequency offset estimation for each UE of the multiple UEs based on receiving the one or more reference signals and decoding an orthogonal cover code for each of the one or more reference signals.

In some examples, to support performing the carrier frequency offset estimation, the CFO estimation manager 1540 is capable of, configured to, or operable to support a means for generating a first carrier frequency offset estimate based on measuring a phase rotation between at least a first group and a second group of the set of multiple groups within at least a first cluster of the set of multiple clusters. In some examples, to support performing the carrier frequency offset estimation, the CFO estimation manager 1540 is capable of, configured to, or operable to support a means for generating a second carrier frequency offset estimate based on measuring a phase rotation between at least the first group of the first cluster and a corresponding first group of a second cluster of the set of multiple clusters and across at least the second group of the first cluster and a corresponding second group of the second cluster. In some examples, to support performing the carrier frequency offset estimation, the CFO estimation manager 1540 is capable of, configured to, or operable to support a means for generating a third carrier frequency offset estimate by applying a likelihood estimator to a carrier frequency offset value corresponding to the one or more reference signals compensated by the first carrier frequency offset estimate and the second carrier frequency offset estimate, where a total carrier frequency offset is based on the first carrier frequency offset estimate, the second carrier frequency offset estimate, and the third carrier frequency offset estimate.

In some examples, the signal compensation manager 1545 is capable of, configured to, or operable to support a means for compensating the one or more reference signals based on decoding an orthogonal cover code for each of the one or more reference signals and a carrier frequency offset estimate.

In some examples, the channel estimation manager 1555 is capable of, configured to, or operable to support a means for performing a channel estimation based on the compensated one or more reference signals.

In some examples, the data signaling manager 1560 is capable of, configured to, or operable to support a means for receiving data signaling from the multiple UEs via one or more symbols located between the set of multiple groups of each cluster. In some examples, the OCC manager 1535 is capable of, configured to, or operable to support a means for decoding the orthogonal cover code corresponding to the data signaling based on the compensated one or more reference signals and the decoded orthogonal cover code for each of the one or more reference signals.

In some examples, the data signaling manager 1560 is capable of, configured to, or operable to support a means for compensating the data signaling according to the carrier frequency offset estimate and based on decoding the orthogonal cover code corresponding to the data signaling. In some examples, the data signaling manager 1560 is capable of, configured to, or operable to support a means for demodulating the compensated data signaling. In some examples, the data signaling manager 1560 is capable of, configured to, or operable to support a means for sending the demodulated data to a channel decoder.

In some examples, the reference signal distribution scheme manager 1525 is capable of, configured to, or operable to support a means for transmitting, via the control signaling, an indication of a quantity of the multiple UEs, an orthogonal cover code codeword corresponding to the orthogonal cover codes, or both.

In some examples, the reference signal distribution scheme manager 1525 is capable of, configured to, or operable to support a means for transmitting, via the control signaling, an indication of a third timing offset between reference signals in each group of the set of multiple groups.

In some examples, the capability information message 1550 is capable of, configured to, or operable to support a means for receiving, from one or more of the multiple UEs, a coherence report, capability information indicating that the multiple UEs support multiplexing, or both, where transmitting the control signaling is based on receiving the coherence report, the capability information, or both.

In some examples, to support transmitting the control signaling, the reference signal distribution scheme manager 1525 is capable of, configured to, or operable to support a means for transmitting a first control message including an indication of a set of multiple schemes for distributing reference signals over the resources that are multiplexed to communicate the signals for the multiple UEs using the orthogonal cover codes, the set of multiple schemes including the scheme. In some examples, to support transmitting the control signaling, the reference signal distribution scheme manager 1525 is capable of, configured to, or operable to support a means for transmitting a second control message indicating the scheme selected from the set of multiple schemes for use.

In some examples, the OCC manager 1535 is capable of, configured to, or operable to support a means for performing, for each cluster, a dot product for each row of a matrix of an orthogonal cover code corresponding to the one or more reference signals for the multiple UEs, each row of the matrix corresponding to a respective UE of the multiple UEs. In some examples, the OCC manager 1535 is capable of, configured to, or operable to support a means for generating, based on the dot product, a combined symbol for which the orthogonal cover code has been decoded for each group of each cluster by combining a quantity of symbols corresponding to a quantity of the multiple UEs for each group of each cluster.

Figure 16:
FIG. 16 shows a diagram of a system including a device that supports reference signal designs for multiple access in uplink in accordance with one or more aspects of the present disclosure.

FIG. 16 shows a diagram of a system 1600 including a device 1605 that supports reference signal designs for multiple access in uplink in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, at least one memory 1625, code 1630, and at least one processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or one or more memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or one or more memory components (e.g., the at least one processor 1635, the at least one memory 1625, or both), may be included in a chip or chip assembly that is installed in the device 1605. In some examples, the transceiver 1610 may be operable to support communications via one or more communications links (e.g., a communication link 125, a backhaul communication link 120, a midhaul communication link 162, a fronthaul communication link 168).

The at least one memory 1625 may include RAM, ROM, or any combination thereof. The at least one memory 1625 may store computer-readable, computer-executable code 1630 including instructions that, when executed by one or more of the at least one processor 1635, cause the device 1605 to perform various functions described herein. The code 1630 may be stored in a non-transitory computer-readable medium such as system memory or another type of memory. In some cases, the code 1630 may not be directly executable by a processor of the at least one processor 1635 but may cause a computer (e.g., when compiled and executed) to perform functions described herein. In some cases, the at least one memory 1625 may contain, among other things, a BIOS which may control basic hardware or software operation such as the interaction with peripheral components or devices. In some examples, the at least one processor 1635 may include multiple processors and the at least one memory 1625 may include multiple memories. One or more of the multiple processors may be coupled with one or more of the multiple memories which may, individually or collectively, be configured to perform various functions herein (for example, as part of a processing system).

The at least one processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1635 may be configured to operate a memory array using a memory controller. In some other cases, a memory controller may be integrated into one or more of the at least one processor 1635. The at least one processor 1635 may be configured to execute computer-readable instructions stored in a memory (e.g., one or more of the at least one memory 1625) to cause the device 1605 to perform various functions (e.g., functions or tasks supporting reference signal designs for multiple access in uplink). For example, the device 1605 or a component of the device 1605 may include at least one processor 1635 and at least one memory 1625 coupled with one or more of the at least one processor 1635, the at least one processor 1635 and the at least one memory 1625 configured to perform various functions described herein. The at least one processor 1635 may be an example of a cloud-computing platform (e.g., one or more physical nodes and supporting software such as operating systems, virtual machines, or container instances) that may host the functions (e.g., by executing code 1630) to perform the functions of the device 1605. The at least one processor 1635 may be any one or more suitable processors capable of executing scripts or instructions of one or more software programs stored in the device 1605 (such as within one or more of the at least one memory 1625). In some implementations, the at least one processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the at least one processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1605 may transmit information output from the chip or modem. Additionally, or alternatively, in some implementations, the one or more interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the at least one memory 1625, the code 1630, and the at least one processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communications at a network entity in accordance with examples as disclosed herein. For example, the communications manager 1620 is capable of, configured to, or operable to support a means for transmitting control signaling including an indication of a scheme for distributing reference signals over resources that are multiplexed to communicate signals for multiple user equipments (UEs) using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The communications manager 1620 is capable of, configured to, or operable to support a means for receiving one or more reference signals from the multiple UEs according to the scheme.

By including or configuring the communications manager 1620 in accordance with examples as described herein, the device 1605 may support techniques for reference signal distribution and transmissions that support OCC transmissions and CFO estimation, resulting in improved reliability of transmissions and improved channel estimation, more efficient utilization of communication resources, decreased signaling errors, improved throughput, and decreased system latency.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, one or more of the at least one processor 1635, one or more of the at least one memory 1625, the code 1630, or any combination thereof (for example, by a processing system including at least a portion of the at least one processor 1635, the at least one memory 1625, the code 1630, or any combination thereof). For example, the code 1630 may include instructions executable by one or more of the at least one processor 1635 to cause the device 1605 to perform various aspects of reference signal designs for multiple access in uplink as described herein, or the at least one processor 1635 and the at least one memory 1625 may be otherwise configured to, individually or collectively, perform or support such operations.

FIG. 17 shows a flowchart illustrating a method 1700 that supports reference signal designs for multiple access in uplink in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving control signaling including an indication of a scheme for distributing reference signals over resources that are multiplexed to communicate signals for multiple UEs including the UE using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The operations of block 1705 may be performed in accordance with examples as disclosed herein. In some examples, aspects of the operations of 1705 may be performed by a reference signal distribution scheme manager 1125 as described with reference to FIG. 11.

At 1710, the method may include transmitting one or more reference signals from the multiple UEs according to the scheme. The operations of block 1710 may be performed in accordance with examples as disclosed herein. In some examples, aspects of the operations of 1710 may be performed by a reference signal transmission manager 1130 as described with reference to FIG. 11.

FIG. 18 shows a flowchart illustrating a method 1800 that supports reference signal designs for multiple access in uplink in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include transmitting a coherence report, capability information indicating that the UE supports multiplexing, or both, where receiving the control signaling is based on transmitting the coherence report, the capability information, or both. The operations of block 1805 may be performed in accordance with examples as disclosed herein. In some examples, aspects of the operations of 1805 may be performed by a capability information manager 1135 as described with reference to FIG. 11.

At 1810, the method may include receiving control signaling including an indication of a scheme for distributing reference signals over resources that are multiplexed to communicate signals for multiple UEs including the UE using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The operations of block 1810 may be performed in accordance with examples as disclosed herein. In some examples, aspects of the operations of 1810 may be performed by a reference signal distribution scheme manager 1125 as described with reference to FIG. 11.

At 1815, the method may include transmitting one or more reference signals from the multiple UEs according to the scheme. The operations of block 1815 may be performed in accordance with examples as disclosed herein. In some examples, aspects of the operations of 1815 may be performed by a reference signal transmission manager 1130 as described with reference to FIG. 11.

FIG. 19 shows a flowchart illustrating a method 1900 that supports reference signal designs for multiple access in uplink in accordance with aspects of the present disclosure. The operations of the method 1900 may be implemented by a network entity or its components as described herein. For example, the operations of the method 1900 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1905, the method may include transmitting control signaling including an indication of a scheme for distributing reference signals over resources that are multiplexed to communicate signals for multiple user equipments (UEs) using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The operations of block 1905 may be performed in accordance with examples as disclosed herein. In some examples, aspects of the operations of 1905 may be performed by a reference signal distribution scheme manager 1525 as described with reference to FIG. 15.

At 1910, the method may include receiving one or more reference signals from the multiple UEs according to the scheme. The operations of block 1910 may be performed in accordance with examples as disclosed herein. In some examples, aspects of the operations of 1910 may be performed by a reference signal reception manager 1530 as described with reference to FIG. 15.

FIG. 20 shows a flowchart illustrating a method 2000 that supports reference signal designs for multiple access in uplink in accordance with aspects of the present disclosure. The operations of the method 2000 may be implemented by a network entity or its components as described herein. For example, the operations of the method 2000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include transmitting control signaling including an indication of a scheme for distributing reference signals over resources that are multiplexed to communicate signals for multiple user equipments (UEs) using orthogonal cover codes, the scheme indicating a set of multiple clusters of the reference signals, each cluster including a set of multiple groups of the reference signals, each group including a set of reference signals associated with each UE of the multiple UEs, where the scheme indicates a first timing offset between each cluster of the set of multiple clusters and a second timing offset between each group of the set of multiple groups, or any combination thereof. The operations of block 2005 may be performed in accordance with examples as disclosed herein. In some examples, aspects of the operations of 2005 may be performed by a reference signal distribution scheme manager 1525 as described with reference to FIG. 15.

At 2010, the method may include receiving one or more reference signals from the multiple UEs according to the scheme. The operations of block 2010 may be performed in accordance with examples as disclosed herein. In some examples, aspects of the operations of 2010 may be performed by a reference signal reception manager 1530 as described with reference to FIG. 15.

At 2015, the method may include decoding an orthogonal cover code corresponding to the one or more reference signals for the multiple UEs based on receiving the one or more reference signals according to the scheme. The operations of block 2015 may be performed in accordance with examples as disclosed herein. In some examples, aspects of the operations of 2015 may be performed by a OCC manager 1535 as described with reference to FIG. 15.

At 2020, the method may include performing a carrier frequency offset estimation for each UE of the multiple UEs based on receiving the one or more reference signals and decoding an orthogonal cover code for each of the one or more reference signals. The operations of block 2020 may be performed in accordance with examples as disclosed herein. In some examples, aspects of the operations of 2020 may be performed by a CFO estimation manager 1540 as described with reference to FIG. 15.

At 2025, the method may include compensating the one or more reference signals based on decoding an orthogonal cover code for each of the one or more reference signals and a carrier frequency offset estimate. The operations of block 2025 may be performed in accordance with examples as disclosed herein. In some examples, aspects of the operations of 2025 may be performed by a signal compensation manager 1545 as described with reference to FIG. 15.

At 2030, the method may include performing a channel estimation based on the compensated one or more reference signals. The operations of block 2030 may be performed in accordance with examples as disclosed herein. In some examples, aspects of the operations of 2030 may be performed by a channel estimation manager 1555 as described with reference to FIG. 15.

The following provides an overview of aspects of the present disclosure:

Aspect 1: A method for wireless communications at a UE, comprising: receiving control signaling comprising an indication of a scheme for distributing reference signals over resources that are multiplexed to communicate signals for multiple UEs comprising the UE using OCCs, the scheme indicating a plurality of clusters of the reference signals, each cluster comprising a plurality of groups of the reference signals, each group comprising a set of reference signals associated with each UE of the multiple UEs, wherein the scheme indicates a first timing offset between each cluster of the plurality of clusters and a second timing offset between each group of the plurality of groups, or any combination thereof; and transmitting one or more reference signals from the multiple UEs according to the scheme.

Aspect 2: The method of aspect 1, further comprising: receiving, via the control signaling, an indication of a quantity of the multiple UEs, an OCC codeword corresponding to the OCCs, or both.

Aspect 3: The method of any of aspects 1 through 2, further comprising: receiving, via the control signaling, an indication of a third timing offset between reference signals in each group of the plurality of groups.

Aspect 4: The method of any of aspects 1 through 3, further comprising: transmitting a coherence report, capability information indicating that the UE supports multiplexing, or both, wherein receiving the control signaling is based at least in part on transmitting the coherence report, the capability information, or both.

Aspect 5: The method of any of aspects 1 through 4, wherein receiving the control signaling comprises: receiving a first control message comprising an indication of a plurality of schemes for distributing reference signals over the resources that are multiplexed to communicate the signals for the multiple UEs using the OCCs, the plurality of schemes comprising the scheme; and receiving a second control message indicating the scheme from the plurality of schemes.

Aspect 6: The method of any of aspects 1 through 5, wherein each reference signal of a group of reference signals of the plurality of groups of the reference signals are orthogonal with respect to the multiple UEs.

Aspect 7: A method for wireless communications at a network entity, comprising: transmitting control signaling comprising an indication of a scheme for distributing reference signals over resources that are multiplexed to communicate signals for multiple user equipments (UEs) using OCCs, the scheme indicating a plurality of clusters of the reference signals, each cluster comprising a plurality of groups of the reference signals, each group comprising a set of reference signals associated with each UE of the multiple UEs, wherein the scheme indicates a first timing offset between each cluster of the plurality of clusters and a second timing offset between each group of the plurality of groups, or any combination thereof; and receiving one or more reference signals from the multiple UEs according to the scheme.

Aspect 8: The method of aspect 7, further comprising: decoding an OCC corresponding to the one or more reference signals for the multiple UEs based at least in part on receiving the one or more reference signals according to the scheme.

Aspect 9: The method of any of aspects 7 through 8, further comprising: performing a CFO estimation for each UE of the multiple UEs based at least in part on receiving the one or more reference signals and decoding an OCC for each of the one or more reference signals.

Aspect 10: The method of aspect 9, wherein performing the CFO estimation comprises: generating a first CFO estimate based at least in part on measuring a phase rotation between at least a first group and a second group of the plurality of groups within at least a first cluster of the plurality of clusters; generating, according to a compensation of the first CFO estimate, a second CFO estimate based at least in part on measuring a phase rotation between at least the first group of the first cluster and a corresponding first group of a second cluster of the plurality of clusters and across at least the second group of the first cluster and a corresponding second group of the second cluster; and generating, according to a compensation of the second CFO estimate, a third CFO estimate by applying a likelihood estimator to a CFO value corresponding to the one or more reference signals compensated by the first CFO estimate and the second CFO estimate, wherein a total CFO is based at least in part on the first CFO estimate, the second CFO estimate, and the third CFO estimate.

Aspect 11: The method of any of aspects 7 through 10, further comprising: compensating the one or more reference signals based at least in part on decoding an OCC for each of the one or more reference signals and a CFO estimate.

Aspect 12: The method of aspect 11, further comprising: performing a channel estimation based at least in part on the compensated one or more reference signals.

Aspect 13: The method of any of aspects 11 through 12, further comprising: receiving data signaling from the multiple UEs via one or more symbols located between the plurality of groups of each cluster; and decoding the OCC corresponding to the data signaling based at least in part on the compensated one or more reference signals and the decoded OCC for each of the one or more reference signals.

Aspect 14: The method of aspect 13, further comprising: compensating the data signaling according to the CFO estimate and based at least in part on decoding the OCC corresponding to the data signaling; demodulating the compensated data signaling; and sending the demodulated data to a channel decoder.

Aspect 15: The method of any of aspects 7 through 14, further comprising: transmitting, via the control signaling, an indication of a quantity of the multiple UEs, an OCC codeword corresponding to the OCCs, or both.

Aspect 16: The method of any of aspects 7 through 15, further comprising: transmitting, via the control signaling, an indication of a third timing offset between reference signals in each group of the plurality of groups.

Aspect 17: The method of any of aspects 7 through 16, further comprising: receiving, from one or more of the multiple UEs, a coherence report, capability information indicating that the multiple UEs support multiplexing, or both, wherein transmitting the control signaling is based at least in part on receiving the coherence report, the capability information, or both.

Aspect 18: The method of any of aspects 7 through 17, wherein transmitting the control signaling comprises: transmitting a first control message comprising an indication of a plurality of schemes for distributing reference signals over the resources that are multiplexed to communicate the signals for the multiple UEs using the OCCs, the plurality of schemes comprising the scheme; and transmitting a second control message indicating the scheme selected from the plurality of schemes for use.

Aspect 19: The method of any of aspects 7 through 18, further comprising: de-orthogonal cover coding the set of reference signals of each group of the of the plurality of groups of a first cluster of reference signals.

Aspect 20: The method of any of aspects 7 through 19, further comprising: performing, for each cluster, a dot product for each row of a matrix of an OCC corresponding to the one or more reference signals for the multiple UEs, each row of the matrix corresponding to a respective UE of the multiple UEs; and generating, based at least in part on the dot product, a combined symbol for which the OCC has been decoded for each group of each cluster by combining a quantity of symbols corresponding to a quantity of the multiple UEs for each group of each cluster.

Aspect 21: A UE for wireless communications, comprising one or more memories storing processor-executable code, and one or more processors coupled with the one or more memories and individually or collectively operable to execute the code to cause the UE to perform a method of any of aspects 1 through 6.

Aspect 22: A UE for wireless communications, comprising at least one means for performing a method of any of aspects 1 through 6.

Aspect 23: A non-transitory computer-readable medium storing code for wireless communications, the code comprising instructions executable by a processor to perform a method of any of aspects 1 through 6.

Aspect 24: A network entity for wireless communications, comprising one or more memories storing processor-executable code, and one or more processors coupled with the one or more memories and individually or collectively operable to execute the code to cause the network entity to perform a method of any of aspects 7 through 20.

Aspect 25: A network entity for wireless communications, comprising at least one means for performing a method of any of aspects 7 through 20.

Aspect 26: A non-transitory computer-readable medium storing code for wireless communications, the code comprising instructions executable by a processor to perform a method of any of aspects 7 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a network entity, comprising:

at least one processor;

at least one memory coupled with the at least one processor; and instructions stored in the at least one memory and executable by the at least one processor to cause the apparatus to:

transmit control signaling comprising an indication of a scheme for distributing reference signals over resources that are multiplexed to communicate signals for multiple user equipments (UEs) using orthogonal cover codes, the scheme indicating a plurality of clusters of the reference signals, each cluster comprising a plurality of groups of the reference signals, each group comprising a set of reference signals associated with each UE of the multiple UEs; and receive one or more reference signals from the multiple UEs according to the scheme.

2. The apparatus of claim 1, wherein the instructions are further executable by the at least one processor to cause the apparatus to:

decode an orthogonal cover code corresponding to the one or more reference signals for the multiple UEs based at least in part on receiving the one or more reference signals according to the scheme.

3. The apparatus of claim 1, wherein the instructions are further executable by the at least one processor to cause the apparatus to:

perform a carrier frequency offset estimation for each UE of the multiple UEs based at least in part on receiving the one or more reference signals and decoding an orthogonal cover code for each of the one or more reference signals.

4. The apparatus of claim 3, wherein the instructions to perform the carrier frequency offset estimation are executable by the at least one processor to cause the apparatus to:

generate a first carrier frequency offset estimate based at least in part on measuring a phase rotation between at least a first group and a second group of the plurality of groups within at least a first cluster of the plurality of clusters;

generate, according to a compensation of the first carrier frequency offset estimate, a second carrier frequency offset estimate based at least in part on measuring a phase rotation between at least the first group of the first cluster and a corresponding first group of a second cluster of the plurality of clusters and across at least the second group of the first cluster and a corresponding second group of the second cluster; and generate, according to a compensation of the second carrier frequency offset estimate, a third carrier frequency offset estimate by applying a likelihood estimator to a carrier frequency offset value corresponding to the one or more reference signals compensated by the first carrier frequency offset estimate and the second carrier frequency offset estimate, wherein a total carrier frequency offset is based at least in part on the first carrier frequency offset estimate, the second carrier frequency offset estimate, and the third carrier frequency offset estimate.

5. The apparatus of claim 1, wherein the instructions are further executable by the at least one processor to cause the apparatus to:

compensate the one or more reference signals based at least in part on decoding an orthogonal cover code for each of the one or more reference signals and a carrier frequency offset estimate.

6. The apparatus of claim 5, wherein the instructions are further executable by the at least one processor to cause the apparatus to:

perform a channel estimation based at least in part on the compensated one or more reference signals.

7. The apparatus of claim 5, wherein the instructions are further executable by the at least one processor to cause the apparatus to:

receive data signaling from the multiple UEs via one or more symbols located between the plurality of groups of each cluster; and decode the orthogonal cover code corresponding to the data signaling based at least in part on the compensated one or more reference signals and the decoded orthogonal cover code for each of the one or more reference signals.

8. The apparatus of claim 7, wherein the instructions are further executable by the at least one processor to cause the apparatus to:

compensate the data signaling according to the carrier frequency offset estimate and based at least in part on decoding the orthogonal cover code corresponding to the data signaling;

demodulate the compensated data signaling; and send the demodulated data to a channel decoder.

9. The apparatus of claim 1, wherein the instructions are further executable by the at least one processor to cause the apparatus to:

transmit, via the control signaling, an indication of a quantity of the multiple UEs, an orthogonal cover code codeword corresponding to the orthogonal cover codes, or both.

10. The apparatus of claim 1, wherein the instructions are further executable by the at least one processor to cause the apparatus to:

transmit, via the control signaling, an indication of a timing offset between reference signals in each group of the plurality of groups.

11. The apparatus of claim 1, wherein the instructions are further executable by the at least one processor to cause the apparatus to:

receive, from one or more of the multiple UEs, a coherence report, capability information indicating that the multiple UEs support multiplexing, or both, wherein transmitting the control signaling is based at least in part on receiving the coherence report, the capability information, or both.

12. The apparatus of claim 1, wherein the instructions to transmit the control signaling are executable by the at least one processor to cause the apparatus to:

transmit a first control message comprising an indication of a plurality of schemes for distributing reference signals over the resources that are multiplexed to communicate the signals for the multiple UEs using the orthogonal cover codes, the plurality of schemes comprising the scheme; and transmit a second control message indicating the scheme selected from the plurality of schemes for use.

13. The apparatus of claim 1, wherein the instructions to transmit the control signaling are executable by the at least one processor to cause the apparatus to:

de-orthogonal cover code the set of reference signals of each group of the of the plurality of groups of a first cluster of reference signals.

14. The apparatus of claim 1, wherein the instructions are further executable by the at least one processor to cause the apparatus to:

perform, for each cluster, a dot product for each row of a matrix of an orthogonal cover code corresponding to the one or more reference signals for the multiple UEs, each row of the matrix corresponding to a respective UE of the multiple UEs; and generate, based at least in part on the dot product, a combined symbol for which the orthogonal cover code has been decoded for each group of each cluster by combining a quantity of symbols corresponding to a quantity of the multiple UEs for each group of each cluster.

15. A method for wireless communications at a network entity, comprising:

transmitting control signaling comprising an indication of a scheme for distributing reference signals over resources that are multiplexed to communicate signals for multiple user equipments (UEs) using orthogonal cover codes, the scheme indicating a plurality of clusters of the reference signals, each cluster comprising a plurality of groups of the reference signals, each group comprising a set of reference signals associated with each UE of the multiple UEs; and receiving one or more reference signals from the multiple UEs according to the scheme.

16. The method of claim 15, further comprising:

decoding an orthogonal cover code corresponding to the one or more reference signals for the multiple UEs based at least in part on receiving the one or more reference signals according to the scheme.

17. The method of claim 15, further comprising:

performing a carrier frequency offset estimation for each UE of the multiple UEs based at least in part on receiving the one or more reference signals and decoding an orthogonal cover code for each of the one or more reference signals.

18. The method of claim 17, wherein performing the carrier frequency offset estimation comprises:

generating a first carrier frequency offset estimate based at least in part on measuring a phase rotation between at least a first group and a second group of the plurality of groups within at least a first cluster of the plurality of clusters;

generating a second carrier frequency offset estimate based at least in part on measuring a phase rotation between at least the first group of the first cluster and a corresponding first group of a second cluster of the plurality of clusters and across at least the second group of the first cluster and a corresponding second group of the second cluster; and generating a third carrier frequency offset estimate by applying a likelihood estimator to a carrier frequency offset value corresponding to the one or more reference signals compensated by the first carrier frequency offset estimate and the second carrier frequency offset estimate, wherein a total carrier frequency offset is based at least in part on the first carrier frequency offset estimate, the second carrier frequency offset estimate, and the third carrier frequency offset estimate.

19. The method of claim 15, further comprising:

compensating the one or more reference signals based at least in part on decoding an orthogonal cover code for each of the one or more reference signals and a carrier frequency offset estimate.

20. The method of claim 15, further comprising:

transmitting, via the control signaling, an indication of a quantity of the multiple UEs, an orthogonal cover code codeword corresponding to the orthogonal cover codes, or both.

21. The method of claim 15, further comprising:

transmitting, via the control signaling, an indication of a timing offset between reference signals in each group of the plurality of groups.

22. The method of claim 15, further comprising:

receiving, from one or more of the multiple UEs, a coherence report, capability information indicating that the multiple UEs support multiplexing, or both, wherein transmitting the control signaling is based at least in part on receiving the coherence report, the capability information, or both.

23. The method of claim 15, further comprising:

transmitting a first control message comprising an indication of a plurality of schemes for distributing reference signals over the resources that are multiplexed to communicate the signals for the multiple UEs using the orthogonal cover codes, the plurality of schemes comprising the scheme; and transmitting a second control message indicating the scheme selected from the plurality of schemes for use.

* * * * *